United States Patent
Di Pietro et al.

(10) Patent No.: US 9,922,196 B2
(45) Date of Patent: Mar. 20, 2018

(54) VERIFYING NETWORK ATTACK DETECTOR EFFECTIVENESS

(71) Applicant: Cisco Technology, Inc., San Jose, CA (US)

(72) Inventors: Andrea Di Pietro, Lausanne (CH); Jean-Philippe Vasseur, Saint Martin D'uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/386,873

(22) Filed: Dec. 21, 2016

(65) Prior Publication Data

US 2017/0103213 A1 Apr. 13, 2017

Related U.S. Application Data

(62) Division of application No. 14/338,852, filed on Jul. 23, 2014.

(51) Int. Cl.
*G06F 21/57* (2013.01)
*H04L 29/06* (2006.01)

(52) U.S. Cl.
CPC ........ *G06F 21/577* (2013.01); *H04L 63/1433* (2013.01); *G06F 2221/034* (2013.01); *H04L 63/1458* (2013.01)

(58) Field of Classification Search
None
See application file for complete search history.

(56) References Cited

U.S. PATENT DOCUMENTS

| | | | | |
|---|---|---|---|---|
| 6,397,359 | B1 * | 5/2002 | Chandra | H04L 41/5009 709/224 |
| 6,782,377 | B2 * | 8/2004 | Agarwal | G06F 17/30707 706/21 |
| 7,721,091 | B2 | 5/2010 | Iyengar et al. | |
| 7,941,855 | B2 | 5/2011 | Sung et al. | |
| 7,953,969 | B2 | 5/2011 | Neystadt et al. | |
| 8,151,341 | B1 | 4/2012 | Gudov et al. | |
| 8,621,618 | B1 * | 12/2013 | Ramsey | H04L 63/1408 370/392 |
| 8,997,227 | B1 * | 3/2015 | Mhatre | H04L 63/1416 726/23 |
| 9,208,323 | B1 * | 12/2015 | Karta | G06F 21/577 |
| 9,348,742 | B1 * | 5/2016 | Brezinski | G06F 21/52 |
| 9,537,719 | B2 * | 1/2017 | Mahadevan | H04L 41/145 |

(Continued)

OTHER PUBLICATIONS

Winter, et al., "RPL: IPv6 Routing Protocol for Low Power and Lossy Networks draft-ietf-roll-rpl-19", Mar. 13, 2011, pp. 1-163.

*Primary Examiner* — Trang Doan
(74) *Attorney, Agent, or Firm* — Parker Ibrahim & Berg LLC; James M. Behmke; Stephen D. LeBarron

(57) ABSTRACT

In one embodiment, a device receives a classifier tracking request from a coordinator device that specifies a classifier verification time period. During the classifier verification time period, the device classifies a set of network traffic that includes traffic observed by the device and attack traffic specified by the coordinator device. The device generates classification results based on the classified set of network traffic and provides the classification results to the coordinator device.

20 Claims, 21 Drawing Sheets

(56) References Cited

U.S. PATENT DOCUMENTS

| | | | |
|---|---|---|---|
| 2003/0208616 A1* | 11/2003 | Laing | H04L 43/50 709/236 |
| 2004/0015719 A1* | 1/2004 | Lee | H04L 63/0227 726/23 |
| 2004/0019781 A1 | 1/2004 | Chari et al. | |
| 2007/0209068 A1 | 9/2007 | Ansari et al. | |
| 2007/0266045 A1 | 11/2007 | Bansal et al. | |
| 2007/0266149 A1 | 11/2007 | Cobb et al. | |
| 2007/0289013 A1 | 12/2007 | Lim | |
| 2008/0052774 A1 | 2/2008 | Chesla et al. | |
| 2008/0083029 A1 | 4/2008 | Yeh et al. | |
| 2008/0186876 A1 | 8/2008 | Nakamura | |
| 2008/0313228 A1* | 12/2008 | Clark | G05B 19/058 |
| 2010/0082513 A1* | 4/2010 | Liu | H04L 63/1458 706/46 |
| 2010/0153316 A1 | 6/2010 | Duffield et al. | |
| 2012/0216282 A1 | 8/2012 | Pappu et al. | |
| 2012/0278890 A1 | 11/2012 | Maatta et al. | |
| 2012/0284791 A1* | 11/2012 | Miller | G06F 21/554 726/22 |
| 2013/0198119 A1* | 8/2013 | Eberhardt, III | G06N 99/005 706/12 |
| 2013/0291108 A1* | 10/2013 | Yu | G06F 21/55 726/23 |
| 2014/0101767 A1* | 4/2014 | Cohen | H04L 63/20 726/25 |
| 2014/0180980 A1* | 6/2014 | Hido | G06N 99/005 706/12 |
| 2015/0067409 A1* | 3/2015 | Martz | G06F 21/00 714/47.2 |
| 2015/0373036 A1* | 12/2015 | Patne | H04L 63/1416 726/23 |

\* cited by examiner

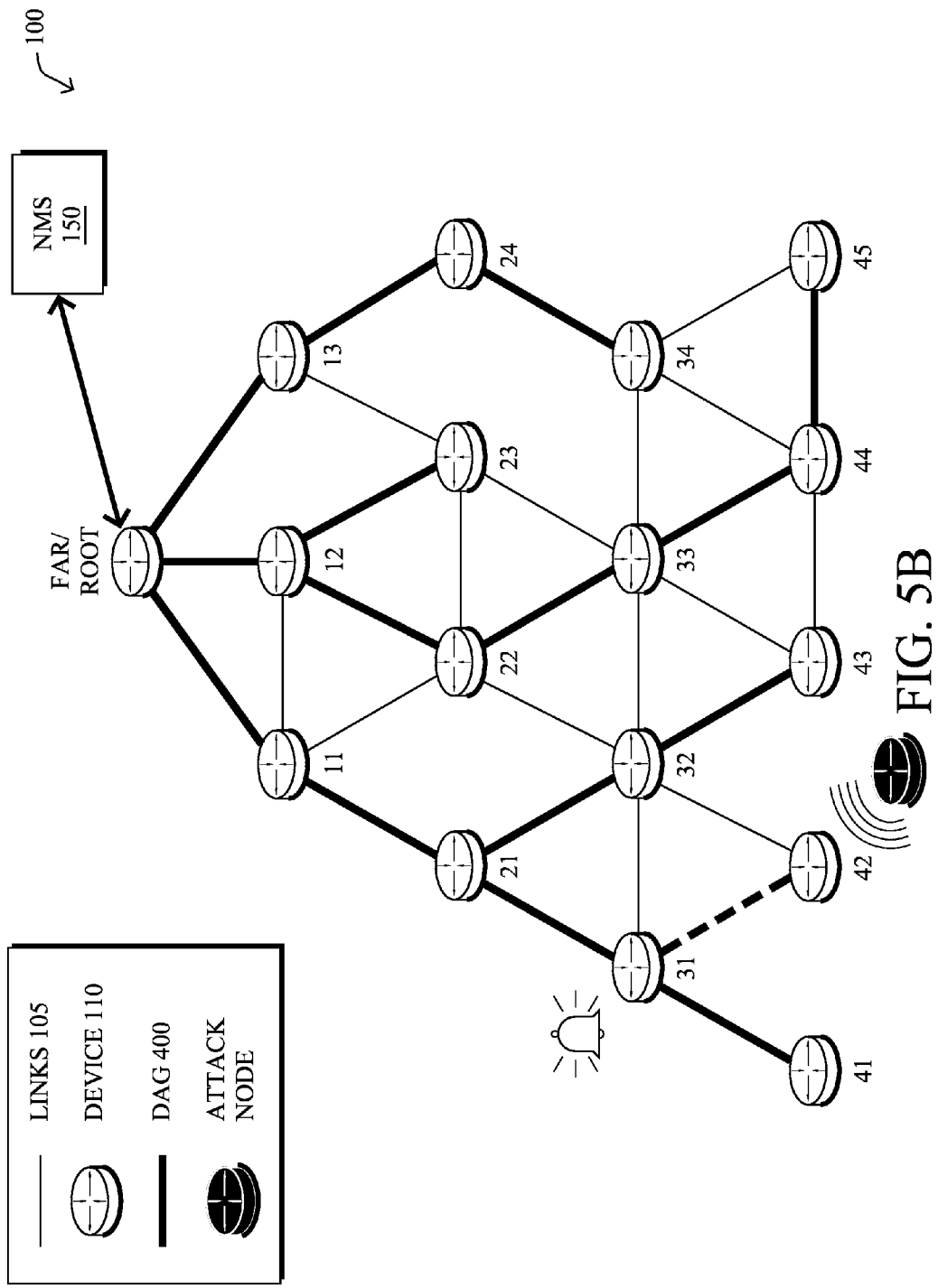

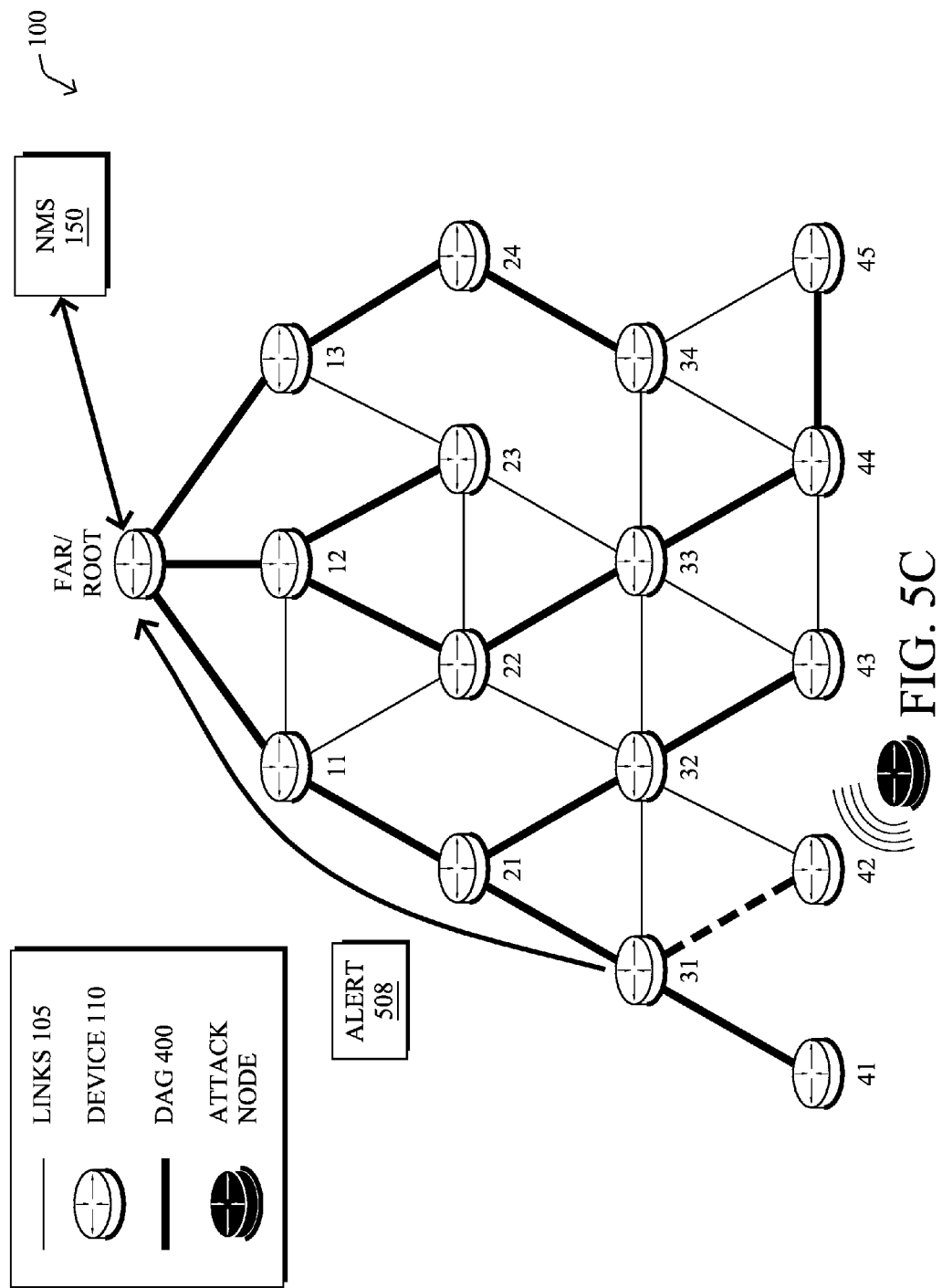

VERIFYING NETWORK ATTACK DETECTOR EFFECTIVENESS

RELATED APPLICATION

This application is a Divisional of U.S. patent application Ser. No. 14/338,852, filed on Jul. 23, 2014, the entire content of which is incorporated herein.

TECHNICAL FIELD

The present disclosure relates generally to computer networks, and, more particularly, to verifying the effectiveness of an attack detector in a computer network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

One type of network attack that is of particular concern in the context of LLNs is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging in the context of LLNs, where the network is typically more susceptible to external conditions, under greater resource constraints, and more dynamic than a traditional network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5C illustrate an example of the detection and reporting of a potential network attack;

DESCRIPTION OF EXAMPLE EMBODIMENTS

Overview

Figure 1:
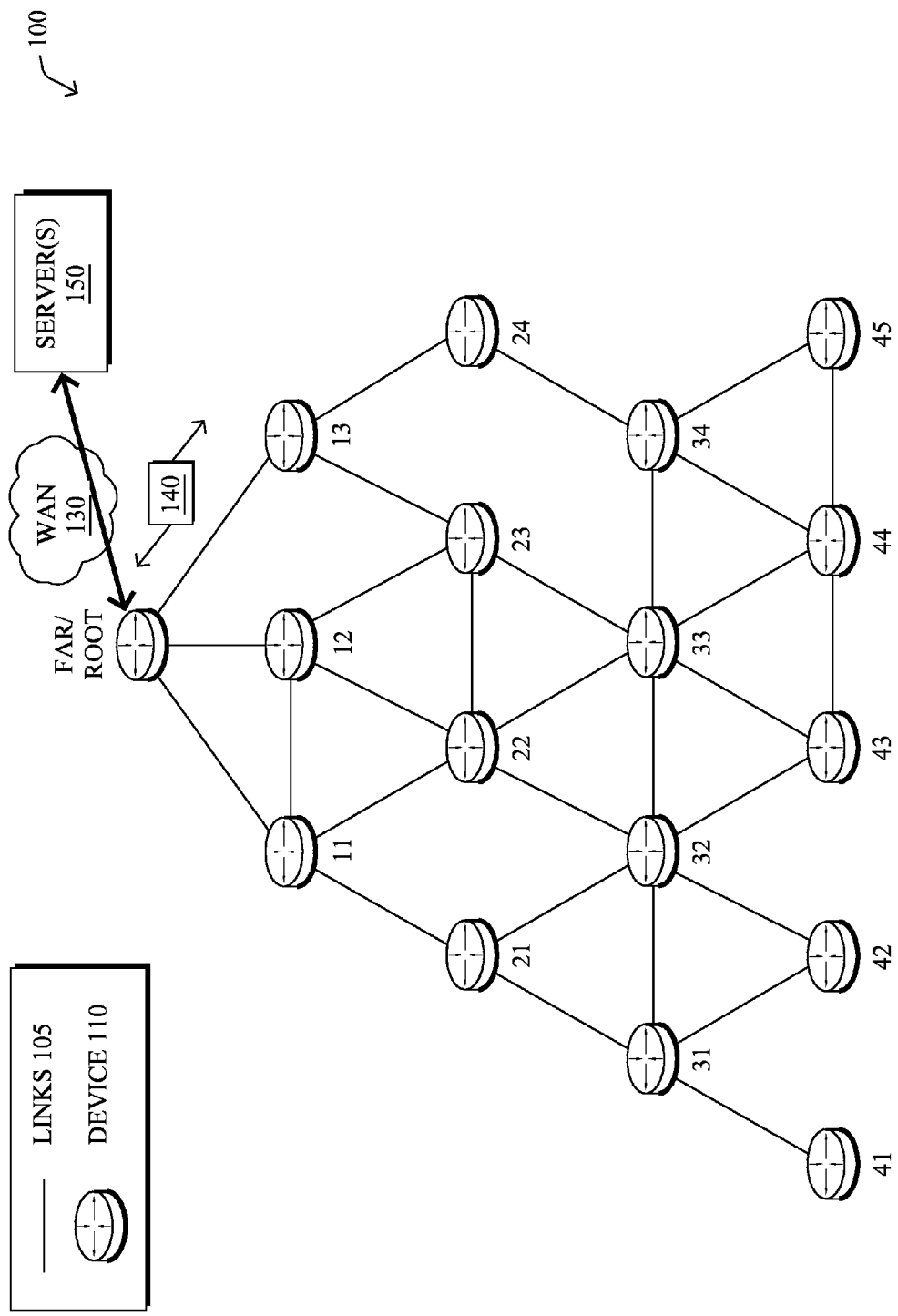
FIG. 1 illustrates an example communication network.

According to one or more embodiments of the disclosure, a device receives a classifier tracking request from a coordinator device that specifies a classifier verification time period. During the classifier verification time period, the device classifies a set of network traffic that includes traffic observed by the device and attack traffic specified by the coordinator device. The device generates classification results based on the classified set of network traffic and provides the classification results to the coordinator device.

In further embodiments, a network device identifies a type of network attack. The device determines a verification schedule during which an attack classifier executed by a device in the network is to be tested. The device coordinates an attack detection test for the attack classifier for execution during the verification schedule and for the identified type of network attack. The device receive results of the attack detection test from the device and evaluates a performance of the attack classifier based on the results of the attack detection test.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) so links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
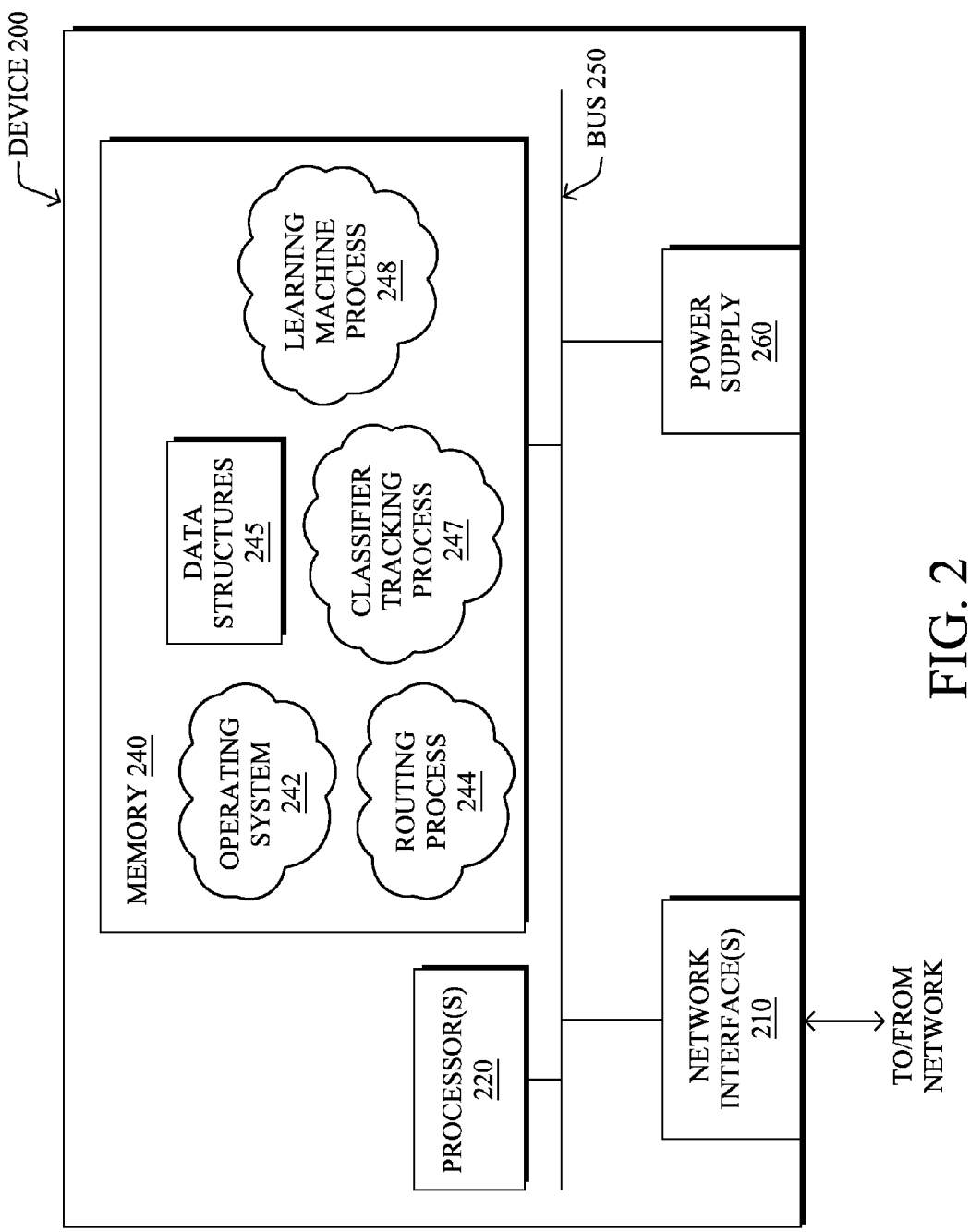
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244, a classifier tracking process 247, and an illustrative "learning machine" process 248, which may be configured depending upon iso the particular node/device within the network 100 with functionality ranging from intelligent learning machine processes to merely communicating with intelligent learning machines, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Learning machine process 248 includes computer executable instructions executed by the processor 220 to perform various functions, such as attack detection and reporting. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Accordingly, learning machine process 248 may be an attack detection classifier that classifies network traffic or conditions into either an "attack" category or a "normal operation" category, based on learned behavior of the network.

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.). In some cases, ANN classifiers may be hierarchical in that a more powerful classifier verifies a conclusion reached by a lower-powered classifier. Other machine learning techniques that may be used in an attack detection classifier may include, but are not limited to, support vector machines (SVMs), naïve Bayesian models, decision trees, and the like.

Learning machine process 248 may also employ anomaly detection techniques, to classify network conditions as being indicative of an attack. Anomaly Detection (AD) is a data mining and machine learning technique that entails detecting, from a flow of data, the elements of the flow that do not follow the same pattern as the other flow elements. In particular, AD techniques may be used to construct a model of normal behavior and may use the model to detect data points that are unlikely to fit the model. Example AD techniques include, but are not limited to, k-NN techniques, one-class SVM techniques, replicator NN techniques, etc. Notably, such techniques may be used by learning machine process 248 to detect previously unseen forms of attacks.

In further embodiments, learning machine process 248 may use clustering techniques, to detect a potential network attack. Clustering denotes a family of techniques in which the objective is to group objects according to some (usually predefined) notion of similarity. For instance, clustering is a very popular technique used in recommender systems (RS) for grouping objects that are similar in terms of people's tastes. This way, the system can propose new products that the user will like with a high probability, based on previous choices of this particular user. Typical clustering algorithms are k-means, DBSCAN or Mean-Shift, among others.

Classifier tracking process 247 includes computer executable instructions executed by the processor 220 to perform the functions described herein with respect to evaluating the effectiveness of an attack detection classifier (e.g., learning machine process 248). In particular, as network conditions change, the effectiveness of an attack classifier may also change. Classifier tracking process 247, as detailed below, may operate to ensure that an attack detection classifier installed within the network remains effective.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
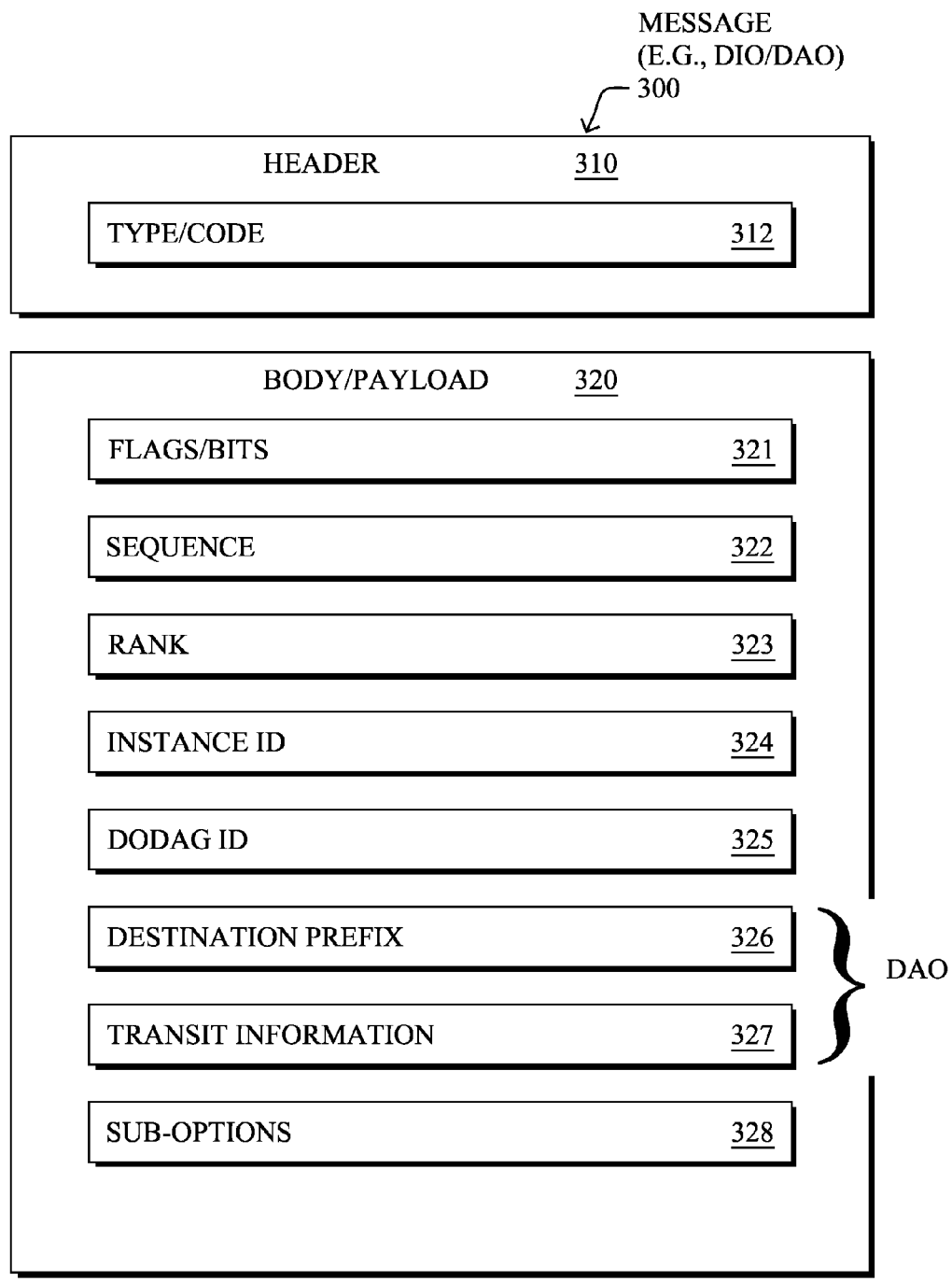
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
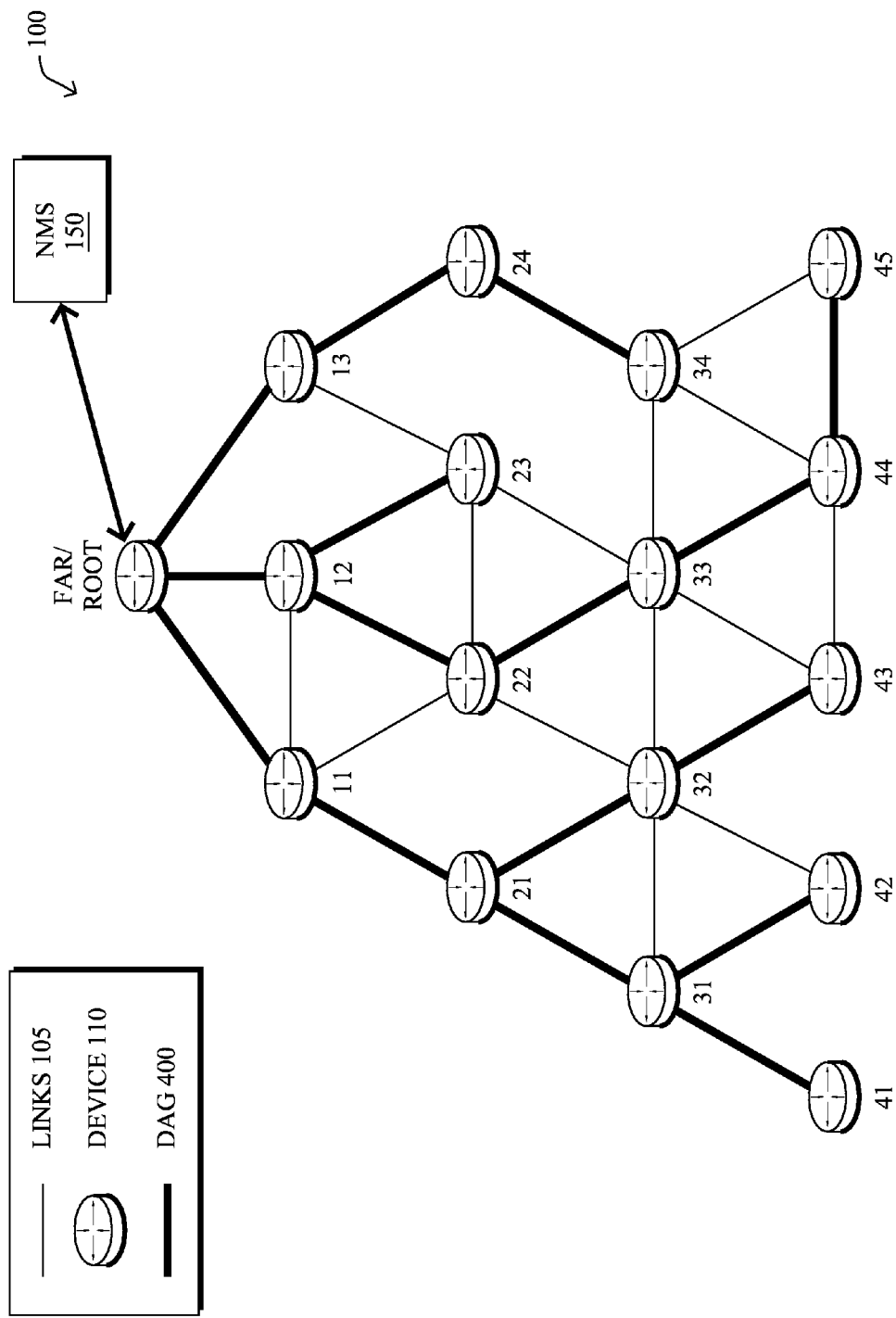
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Figure 5A:
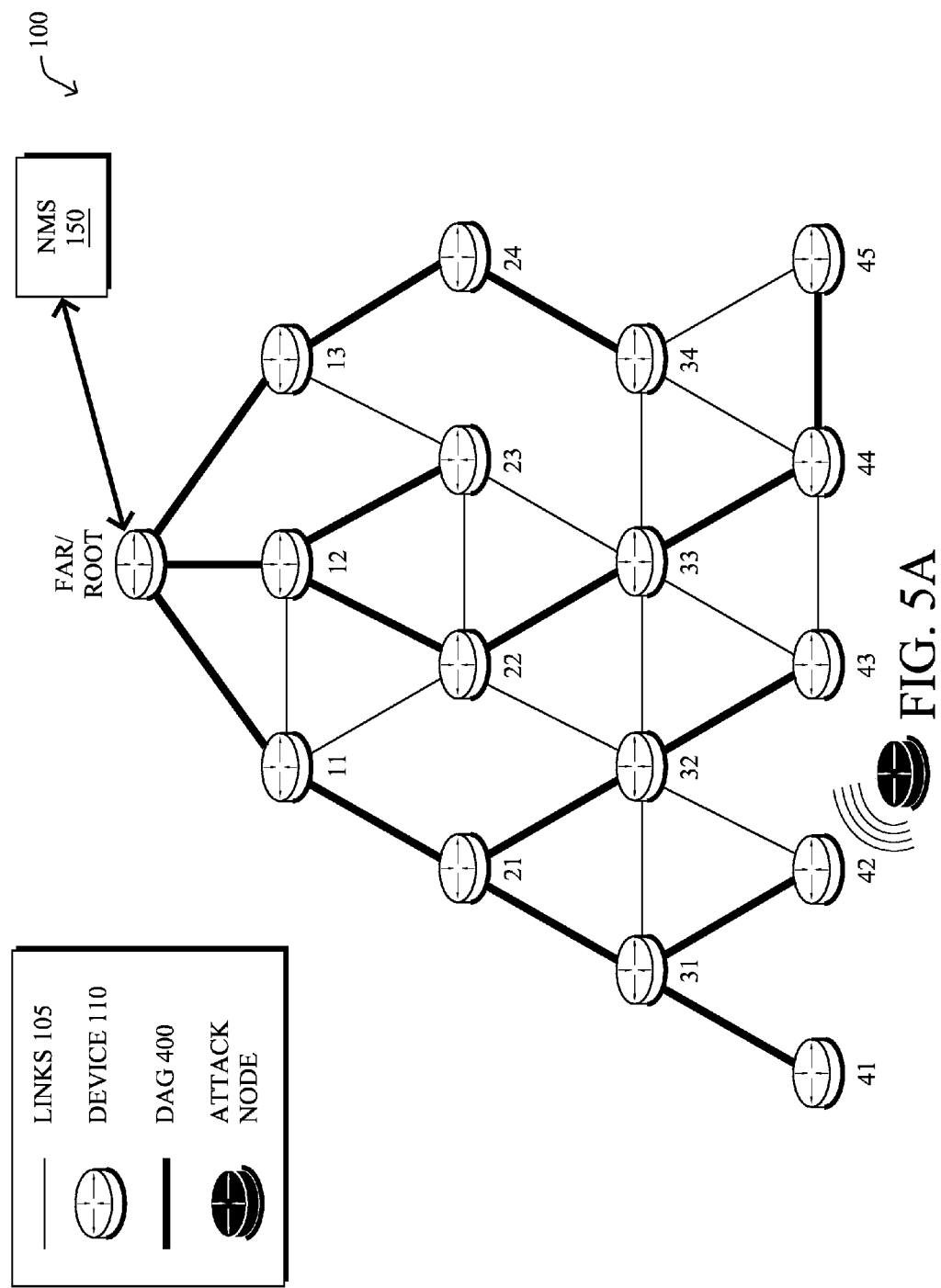

Referring now to FIGS. 5A-5C, an example is illustrated of a network attack being detected and reported within network 100. Any or all of the nodes/devices 200 shown may execute a learning machine process (e.g., learning machine process 248) that is configured to detect potential network attacks, such as a DoS attack, using a machine learning classifier. Assume for illustrative purposes that an attack node/device launches an attack targeted at node 42, as shown in FIG. 5A. As a result of the attack, the performance of the communication link between nodes 42 and 31 may change (e.g., by affecting the amount of packet loss along the link, by increasing number of requests originating from node 42, by increasing delays, etc.). In such a case, the learning machine process executed by node 31 may analyze the changes and determine that a potential attack has been detected, as shown in FIG. 5B. In response, as shown in FIG. 5C, node 31 may generate and send an alert 508 to a supervisory device such as the network FAR/Root, NMS, or other such device via which corrective measures may be taken (e.g., by alerting a human operator of the potential attack, instituting routing changes, etc.). As will be appreciated, alerts and other corrective measures may also be initiated by any other node in addition to that of node 31, such as node 42, other neighbors of node 42, etc.

As noted above, attack detection classifiers may be distributed throughout a network. However, once deployed, the effectiveness of a given classifier may change over time. In some implementations, mechanisms such as watchdog processes, keep-alive messages, etc., may be employed to ensure that a particular attack detection classifier remains functional. However, these types of mechanisms only ensure that the classifier remains active (e.g., by ensuring that the classifier responds, etc.). In other words, these mechanisms do nothing to ensure that a deployed classifier remains effective at detecting a network attack.

The effectiveness and validity of an attack detection classifier may change for a number of different reasons. In particular, since the output of a learning machine depends on the statistical features of the observed traffic, a considerable and unanticipated change in the traffic composition may make attack detection impossible for the classifier. For example, if major changes occur in the network (e.g., as is typical in LLNs), or if new applications are introduced that alter the aggregate traffic profile, a deployed attack detector may become ineffective at detecting attacks on the network. Said differently, the performance of a machine learning classifier depends heavily on the classifier being trained on a data set that accurately reflects the statistical behavior of the traffic to be observed by the classifier. During deployment, a preliminary analysis of the traffic to be observed by the classifier may be performed, to ensure that the observed traffic matches the training data. However, as time progresses, the statistic behavior of the observed traffic may change (e.g., if new nodes connect to the network and/or new 445 applications emerge). Consequently, the traffic behavior observed by the classifier may drift from that of the training set and the classifier may cease to be effective.

In some implementations, a naïve approach may be taken to ensure the performance of an attack detection classifier remains above a threshold amount. For example, actual attacks may be launched against the network periodically, to assess the effectiveness and validity of a deployed attack detector. However, this may not be practical or feasible in a number of scenarios. Notably, initiating a realistic attack may require the non-trivial use of resources (e.g., attackers often leverage large botnets of compromised hosts spread across the globe). In addition, a realistic attack may seriously impair network and service availability within the up and running network.

Verifying Network Attack Detector Effectiveness

The techniques herein allow for the verification that a machine learning module (e.g., a deployed attack detection classifier) is still valid by reproducing a perceived attack condition at specified instances. In some aspects, aggregated records (e.g., Netflow records, other traffic records, etc.), may be used locally on the host of the classifier with no impact on the network itself. In other aspects, actual "fake" attack traffic may be placed onto the network using a mechanism that avoids impacting legitimate traffic on the network. In either case, such verifications may be carried out under the control of a policy engine. In further aspects, the local modeling of normal traffic may also be used to inform a an attack coordinator that the normal traffic patterns have changed, thus requiring verification that the attack detector is still effective.

Specifically, according to one or more embodiments of the disclosure as described in detail below, a device receives a classifier tracking request from a coordinator device that specifies a classifier verification time period. During the classifier verification time period, the device classifies a set of network traffic that includes traffic observed by the device and attack traffic specified by the coordinator device. The device generates classification results based on the classified set of network traffic and provides the classification results to the coordinator device.

Illustratively, the techniques described herein may be performed by hardware, software, and/or firmware, such as in accordance with processes 247-248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, a mechanism is disclosed that allows the performance of a machine learning attack detector to be tracked, to check whether the detector is still capable of detecting the attack for which it was trained to detect. In some embodiments, a network device (e.g., a FAR/root node, a centralized networking device such as an NMS, etc.) may operate as a classifier tracking coordinator (CTR) that is in charge of coordinating the classifier tracking activities described herein. While the machine learning processes are described primarily with respect to an attack detection classifier, other machine learning techniques may also be validated by the CTR in a similar manner.

In general, the CTR may operate as an entry point for a network administrator to setup the performance level that the classifier needs to satisfy. In particular, the CTR may provide a user interface for specifying, for each type of the detected attacks, the minimum precision and recall values which are considered acceptable. Notably, these thresholds may depend on the specific attack types. For example, a high recall may be set for a particularly harmful type of attack, at the expense of increasing the frequency of false positives. In some embodiments, these parameters may also be adjusted automatically and/or optimized automatically (e.g., using a closed control loop mechanism, machine learning techniques, etc.).

Figure 6:
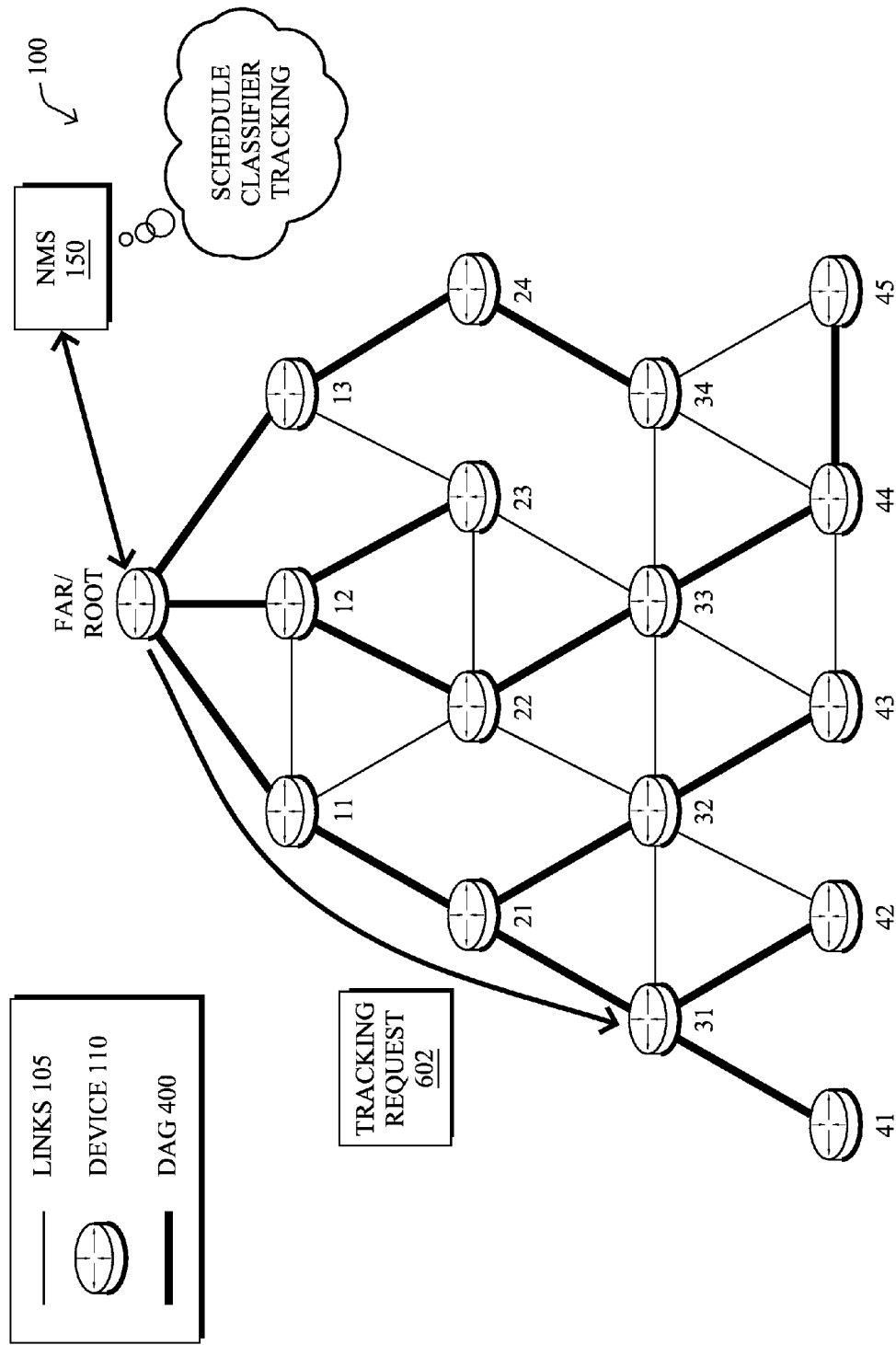
FIG. 6 illustrates an example of classifier tracking being scheduled.

Referring now to FIG. 6, an example of classifier tracking being scheduled is shown, according to various embodiments. Once the performance parameters have been established for a given classifier, the CTR may orchestrate the classifier validation testing activities. For example, as shown in FIG. 6, NMS 150, the FAR/root node, or another network device acting as the CTR may schedule, for each type of attack, the validation activities for the corresponding attack detector. The schedule may include, for example, a mean value used for tracking the classifier performance during the test and the scheduled time(s) at which the tracking activities are to take place.

Once a tracking activity has been scheduled by the CTR, the responsible entity (e.g., the device hosting the attack detector) may be notified by the CTR of the scheduled tracking. For example, as shown in FIG. 6, a tracking request 602 may be sent to node 31, which hosts an attack classifier to test. In various embodiments, tracking request 602 may include any or all of the following: information regarding when the validation test is to occur (e.g., tracking request 602 may include an initial timestamp, a duration for the validation activity, etc.), an identifier for the attack for which the classifier has been validated, or a priority class for the attack traffic to be used during the test.

In some cases, tracking classifier performance can potentially require the use of non-negligible networking resources. For example, the testing may consume processor and memory resources of one or more nodes, in case already available records are used in the test. In another example, network bandwidth may be consumed, in case attack traffic is actually injected into the network during the test.

In some embodiments, the CTR may interact with a policy engine, to request permission to perform a particular validation test at a particular time. For example, the CTR may ask the policy engine whether it could replay a particular attack (e.g., involving a specified maximum bandwidth consumption) at a given instant. In response, the policy engine may determine whether or not the available resources on the involved device(s) and/or in the network are such that the validation test will not impact legitimate traffic within the network. In one embodiment, the policy engine may simply authorize or refuse authorization. In another embodiment, the policy engine may reply by assigning a particular priority class to the replayed traffic that is to be used during the validation test (e.g., the attack traffic may be generated with a DSCP marking indicating a low priority class, so as not to disrupt the actual traffic). In further embodiments, the policy engine may suggest a different time at which the test may be performed. For example, the policy engine may suggest another time that has historically exhibited a lower volume of network traffic or is predicted to exhibit a lower demand on the network (e.g., based on a machine learning model).

The CTR may also interact with the network monitoring subsystem (e.g. by using the SNMP protocol, etc.), to learn the state of the background traffic. In some cases, the CTR may use this information to reproduce the attack with different intensities of background traffic, to track the classifier performance under any or all potential attack conditions.

Tracking can be performed by using several methods, as detailed below. In one embodiment, previously collected traffic records may be mixed with currently monitored traffic, during a validation test. Such a mixing may be performed locally by the node hosting the attack detector. In another embodiment, malicious traffic may be injected into the network during the test by one or more other nodes, while using quality of service (QoS) and priority mechanisms, to ensure that normal traffic is not affected by the test.

Figure 7A:
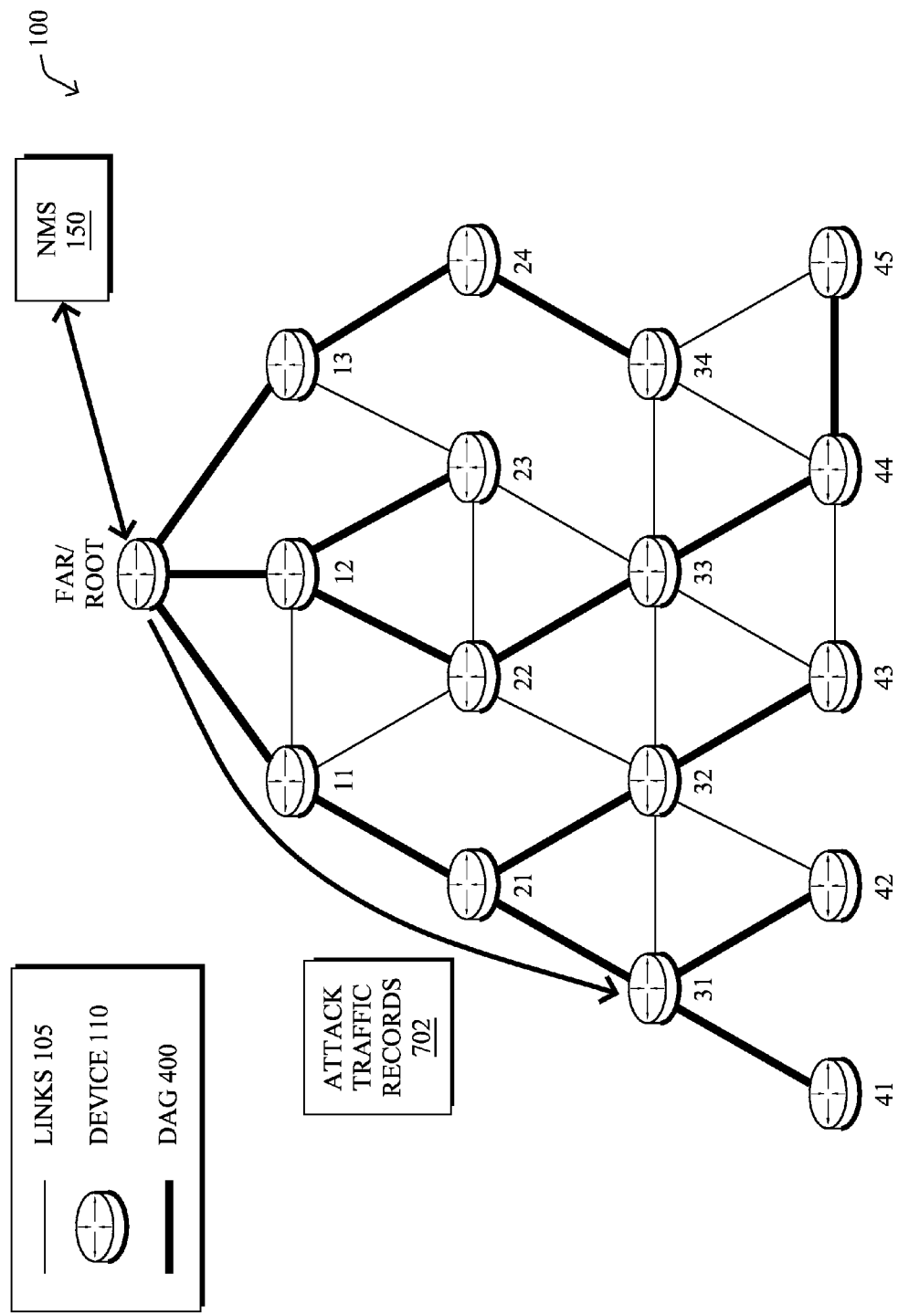
FIGS. 7A-7C illustrate an example of attack classifier effectiveness being evaluated by co-mingling traffic.

In implementations in which pre-available traffic records are mixed with current network traffic during a validation test, the CTR may store a database of attack traffic records which have been pre-collected and are representative of the attack pattern to be tested. Once a classifier tracking activity is scheduled, the CTR may download a subset of its database to the node hosting its classifier. For example, as shown in FIG. 7A, attack traffic records 702 may be provided to node 31 for use during a scheduled validation test. In some cases, a suitable subset of the traffic records may be selected for inclusion in attack traffic records 702 by the CTR. For example, the CTR may select any number of subsets of test traffic, to systematically cover the space of possible attack characteristics (e.g., to vary the attack intensity, to vary the ratios of normal and attack traffic, etc.). In another embodiment, the attack samples can be cached on the classifier node so as to minimize data transfer to be potentially used in the future when required.

Figure 7B:
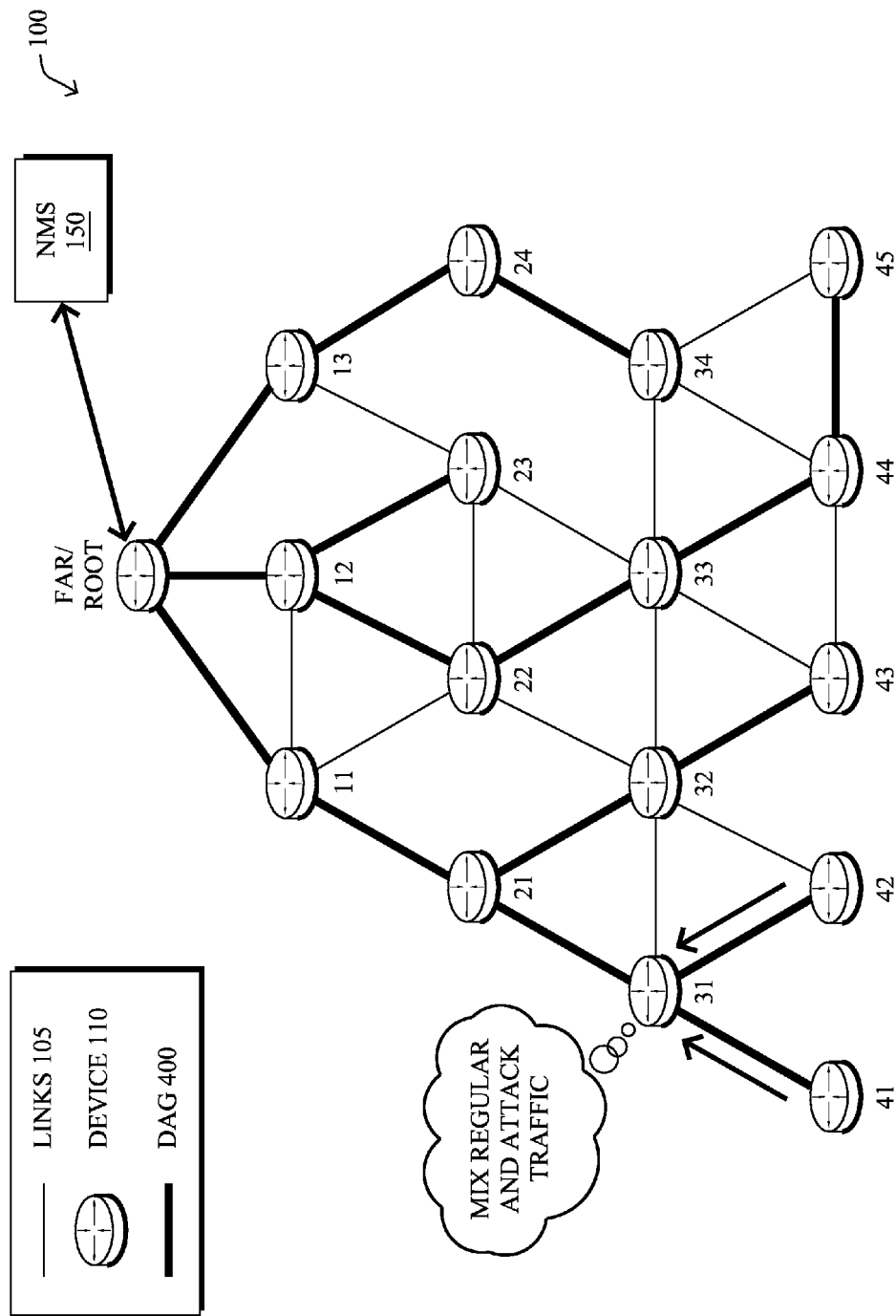
Figure 7C:
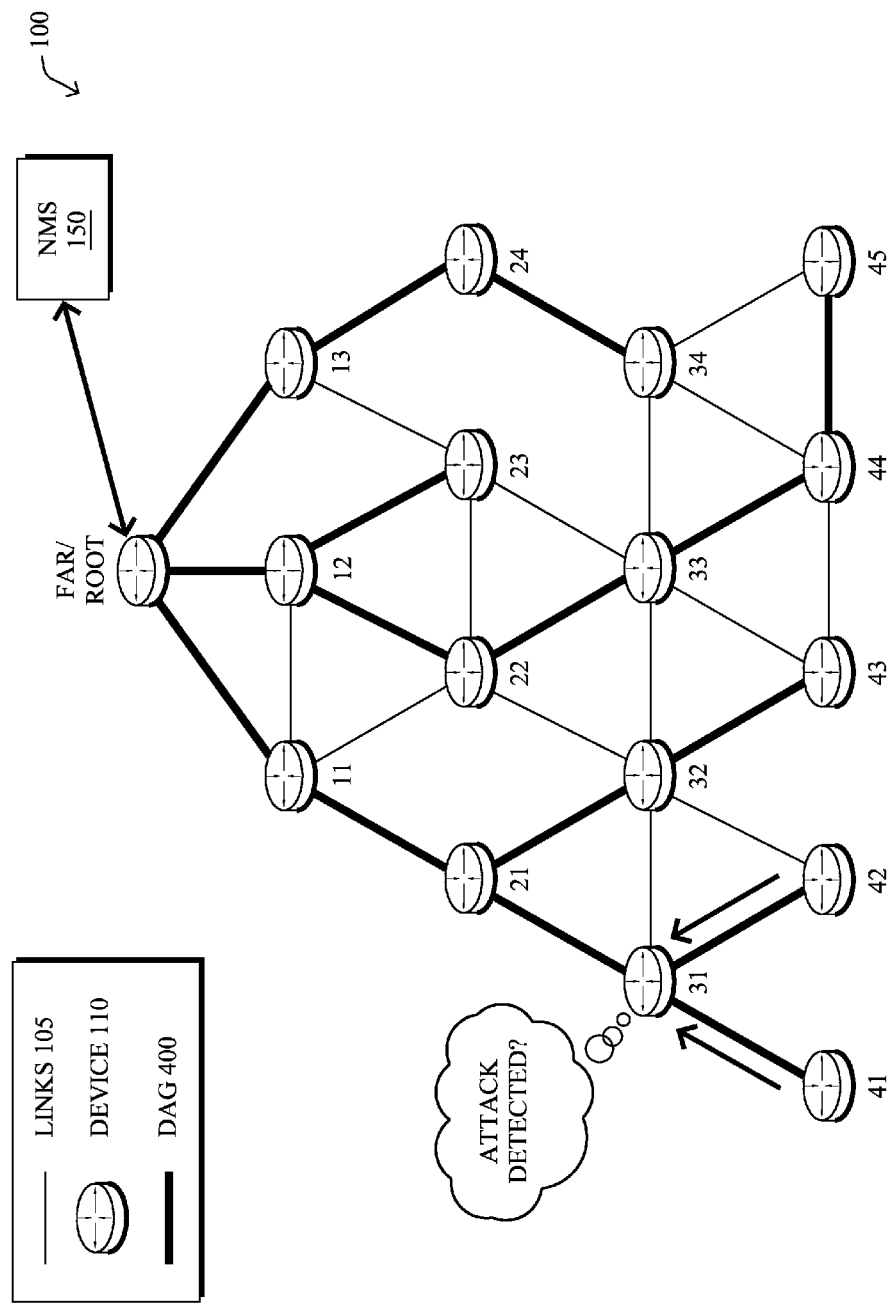

At the scheduled time specified by the CTR, the node hosting the attack detector may mix traffic records representative of the "fake" attack with actual traffic records from the network monitor. This allows checking that the output of the classifier reflects the presence of the replayed attack samples. For example, as shown in FIGS. 7B-7C, node 31 may intermix attack traffic records 702 with that of actual network traffic received from nodes 41 and 42, to determine whether or not the attack detector local to node 31 is still able to detect the tested attack type. Since, while this kind of test is carried out, the classifier is actually "blind" with respect to the actual behavior of the network (e.g., actual attacks may not be detected while the test is taking place), the detection chain can be duplicated, in some embodiments. For example, while one copy of the chain inspects the network traffic only, the second instance is used for testing, should a real attack take place while the test is being carried out (e.g., as separate processes). Said differently, a validation test may make use of previously collected flow records (e.g., local to the detector node) that are mixed with "live" flow records or other statistics related to the regular and current traffic, without impacting the network. Notably, this approach does not require sending the actual test/attack traffic over the links of the network, thereby limiting bandwidth consumption along the network links.

In some cases, attack traces cannot be used as-is because they may be inconsistent with the network scenario in which the classifier operates. In these cases, a customization of the attack traces sent to the particular classifier installation may be used. For example, IP addresses in the attack records may be overwritten, to tailor the validation test to a particular attack detector/node. In one embodiment, the CRT pre-processes the traffic traces before downloading them to the node hosting the attack detector. In another embodiment, the node hosting the attack detector may itself modify the attack records, prior to conducting the test.

Figure 8A:
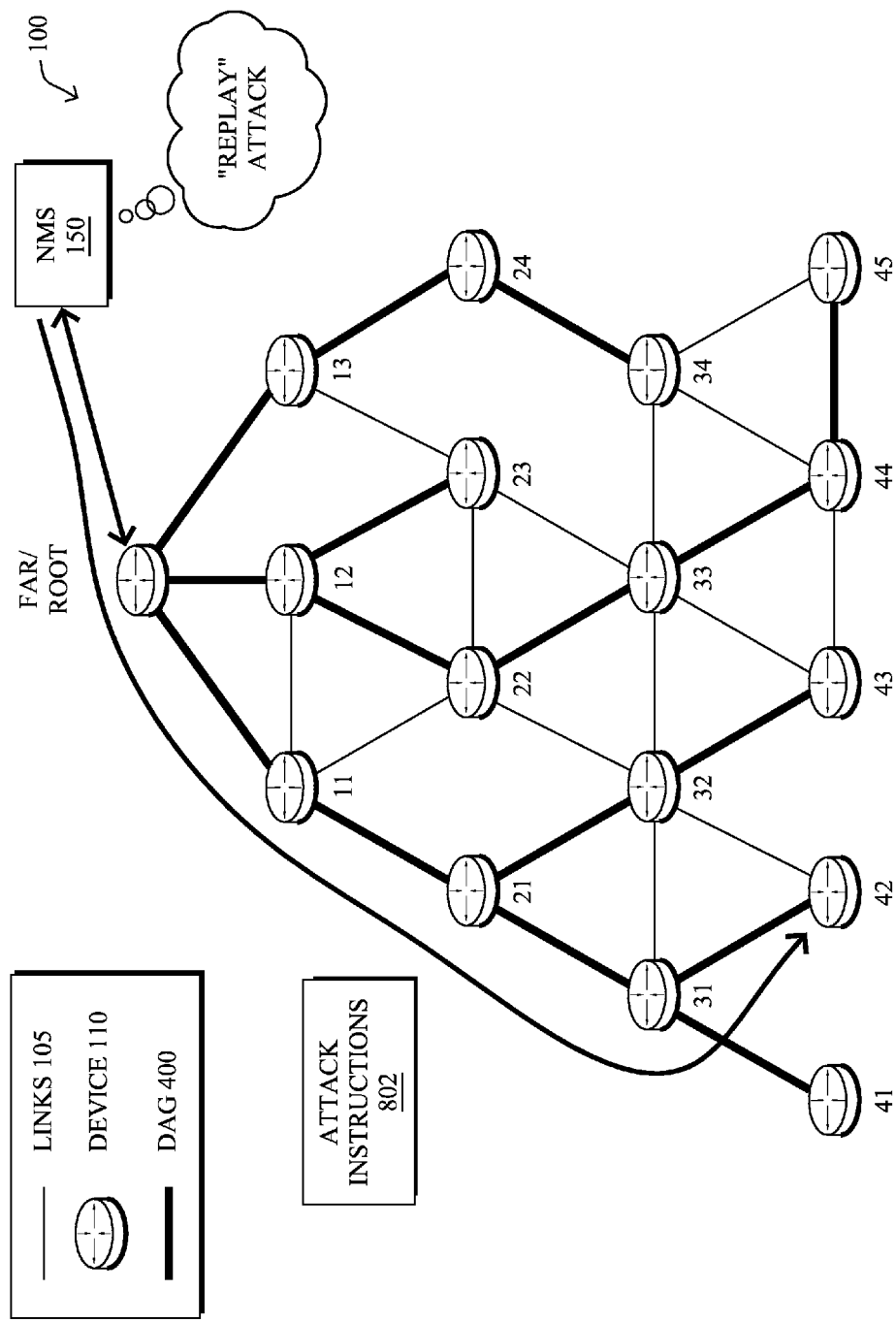
FIGS. 8A-8C illustrate an example of attack classifier effectiveness being evaluated by replaying an attack.
Figure 8B:
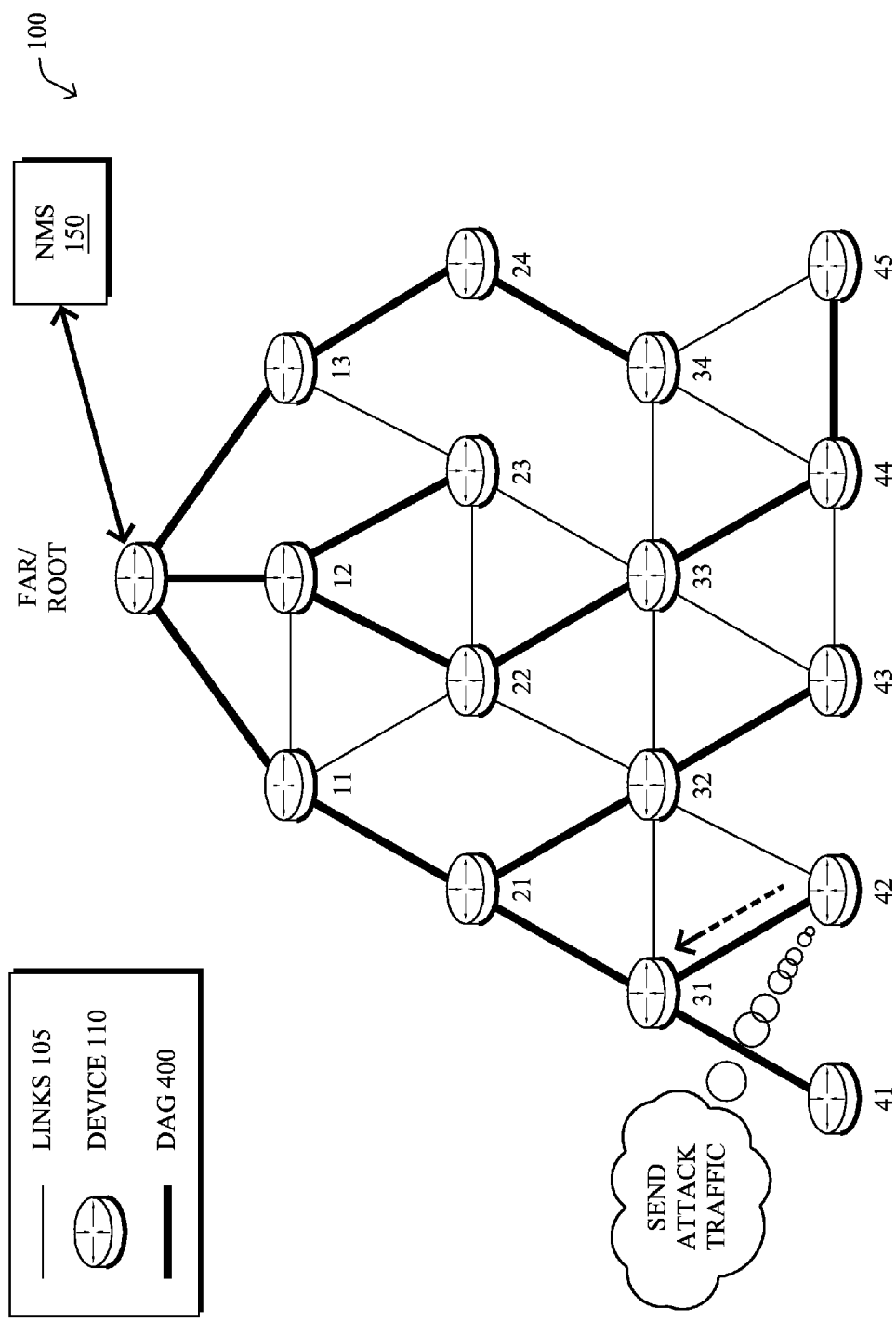
Figure 8C:
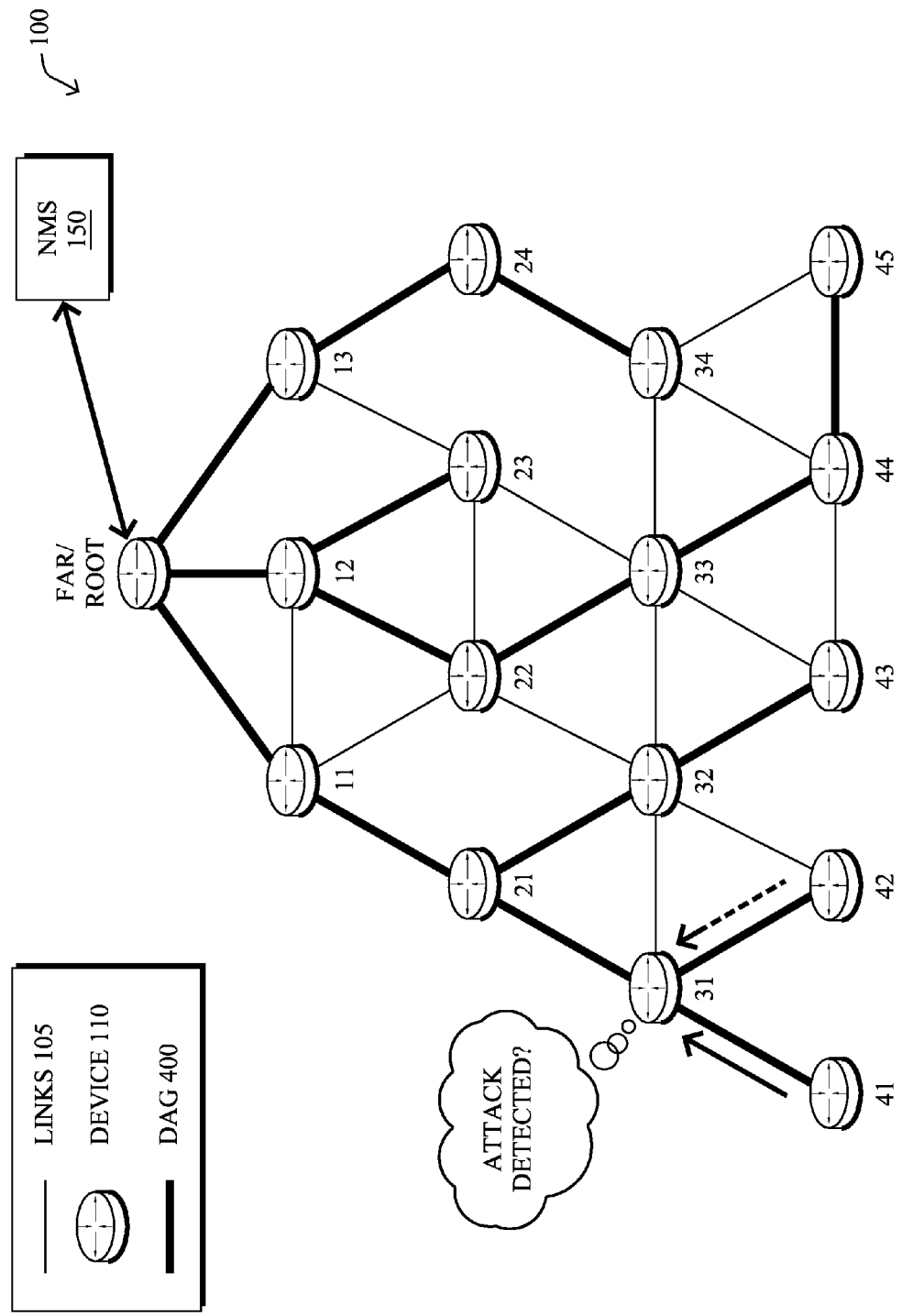

In alternate embodiments, the performance of a classifier may be tested by actively replaying attack records in the network. In other words, the attack records may be used in this case to generate network traffic (e.g., as opposed to the detector node evaluating attack records internally). This may be performed in such a way that the attacks are reproduced as realistically as possible without affecting the quality of service perceived by the legitimate traffic. In one embodiment, the CRT (possibly after querying the policy engine) may select a set of nodes in the network that can be used for replaying attack traces. For example, as shown in FIG. 8A, the CRT may send attack instructions 802 to node 42 including the attack traffic to be used during the test. At the scheduled testing time, node 42 may then send the corresponding attack traffic to node 31, to test the performance of the attack detector hosted on node 31, as shown in FIGS. 8B-8C. In yet another embodiment a different routing topology may be used for this purpose, using Multi Topology Routing, for example.

Attack replay may be performed using different sub-mechanisms, depending on the particular attack type to be tested. In case of network based attacks (e.g., application-agnostic attacks which aim to disrupt network connectivity), the attack traffic may be assigned the lowest possible priority, so as not to disrupt legitimate traffic. In another embodiment, attack flows may be marked with a special tag (e.g., using the Flow Label field of the IPv6 packet). The purpose of this mechanism is two-fold. On one hand, it allows testing the effectiveness of traffic flagging techniques, which need to discriminate attack and normal traffic at the flow level (and therefore need to know the background truth at that granularity). On the other hand, it also allows marking attack traffic at the flow level, so that the traffic can be discarded and policed if it becomes harmful to the network.

Optionally, a tag included in a testing attack flow may also include a sequence number as part of a custom IPv6 header. Such a header may be used by the detector/node to check whether a significant portion of the attack traffic has been dropped (e.g., in lieu of higher priority, legitimate network traffic). Notably, if an excessive portion of the attack traffic has been dropped, its statistical profile may have been excessively distorted for the classifier to detect it. Such a situation may not occur in the case of a real attack, as actual attack traffic would not be deprioritized. In this situation, the results of the test may be invalidated and the tracking activity may be repeated at another time.

In case an application level attack has to be replayed, deprioritizing attack traffic may not be necessary (as its amount may very well be negligible). On the other hand, since the attack is targeted against a server, a server based QoS mechanism may be set up, so as to give lower priority to the attack connections. Furthermore, in case of attacks used to exhaust specific resources on the server (e.g. directed towards a specific TCP port), attack messages can be simply ignored. In another embodiment, the malicious traffic can be directed towards a special purpose sinkhole server whose only role is to be the target of attack traffic.

Figure 9A:
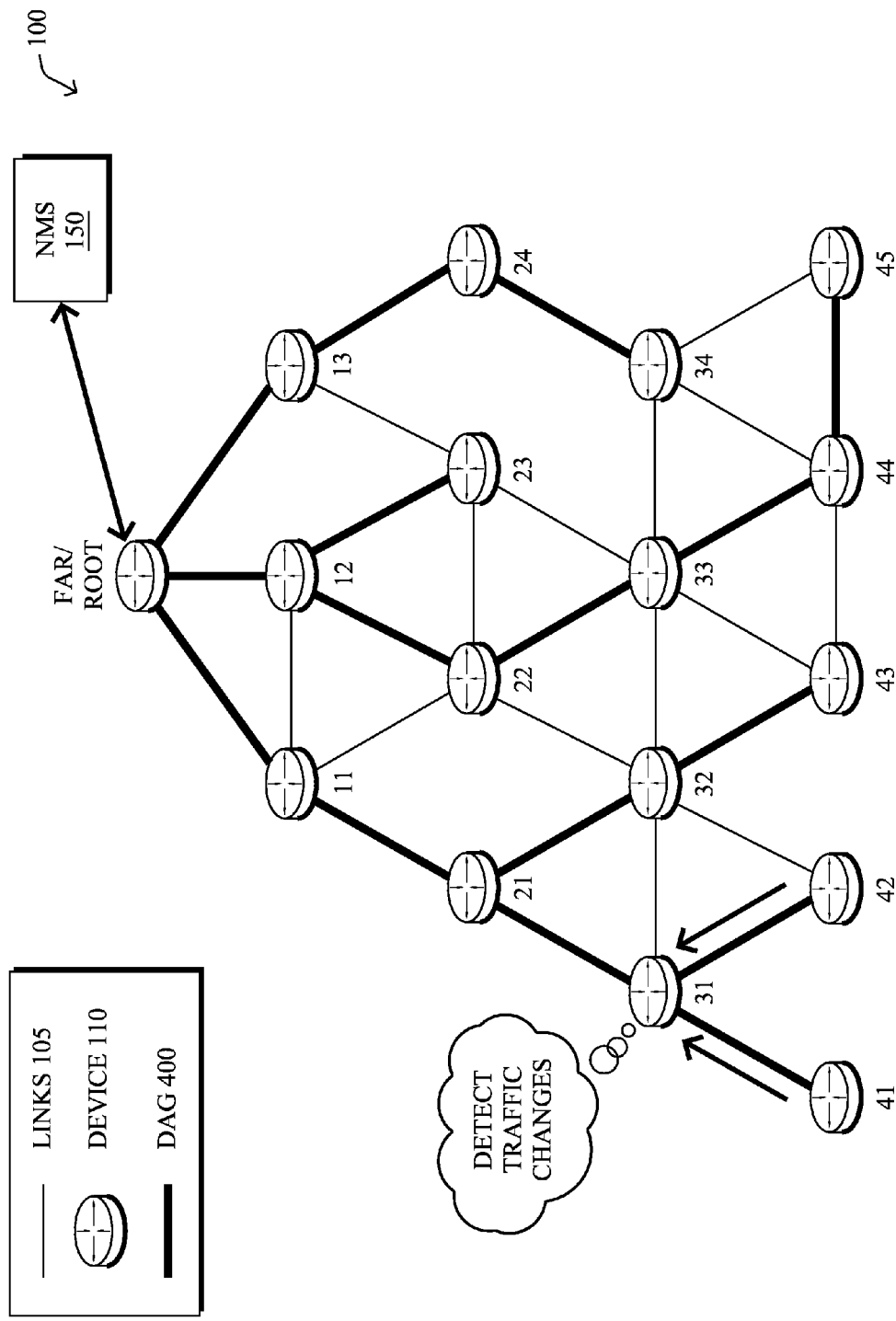
FIGS. 9A-9B illustrate an example of an attack classifier requesting classifier testing.
Figure 9B:
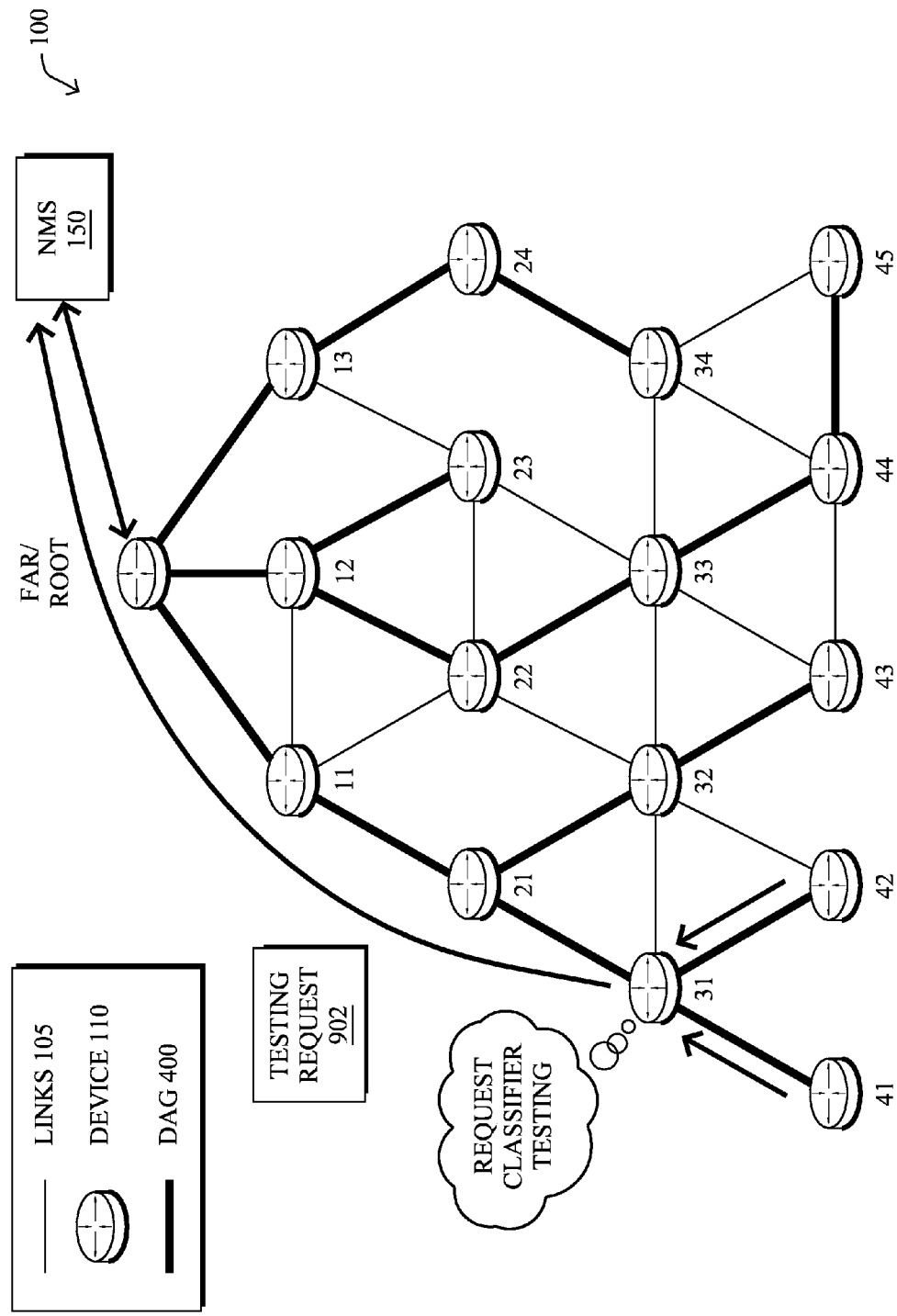

In some embodiments, a node hosting an attack detector may request that its performance be tested. In such a case, the node may send a newly specified message referred to as a test request message back to the CRT, to request scheduling of a test. In one embodiment, the learning machine mechanism local to the node may be used to trigger a test request. In particular, the node may locally build a model of its observed normal traffic. Such a model allows assigning the traffic an anomaly score which measures its 'statistical divergence' from the usual normal traffic. Any number of learning machine models may be used to model the traffic (e.g., cluster analysis, Gaussian Mixture Models, change point detection, etc.). Once the model has been computed, the observed traffic may be scored continuously. If the average score diverges too much, this may be an indicator that the traffic scenario is undergoing significant changes and that a tracking activity should be triggered. In this case, the node sends a test request message to the CRT, which will decide whether to schedule a new tracking activity. For example, as shown in FIG. 9A, node 31 may determine that the traffic received from nodes 41-42 has diverged from its local traffic model, indicating that the traffic pattern has potentially changed. In such a case, node 31 may send a testing request 902 to the CRT, to request scheduling of a validation test, as shown in FIG. 9B.

Figure 10A:
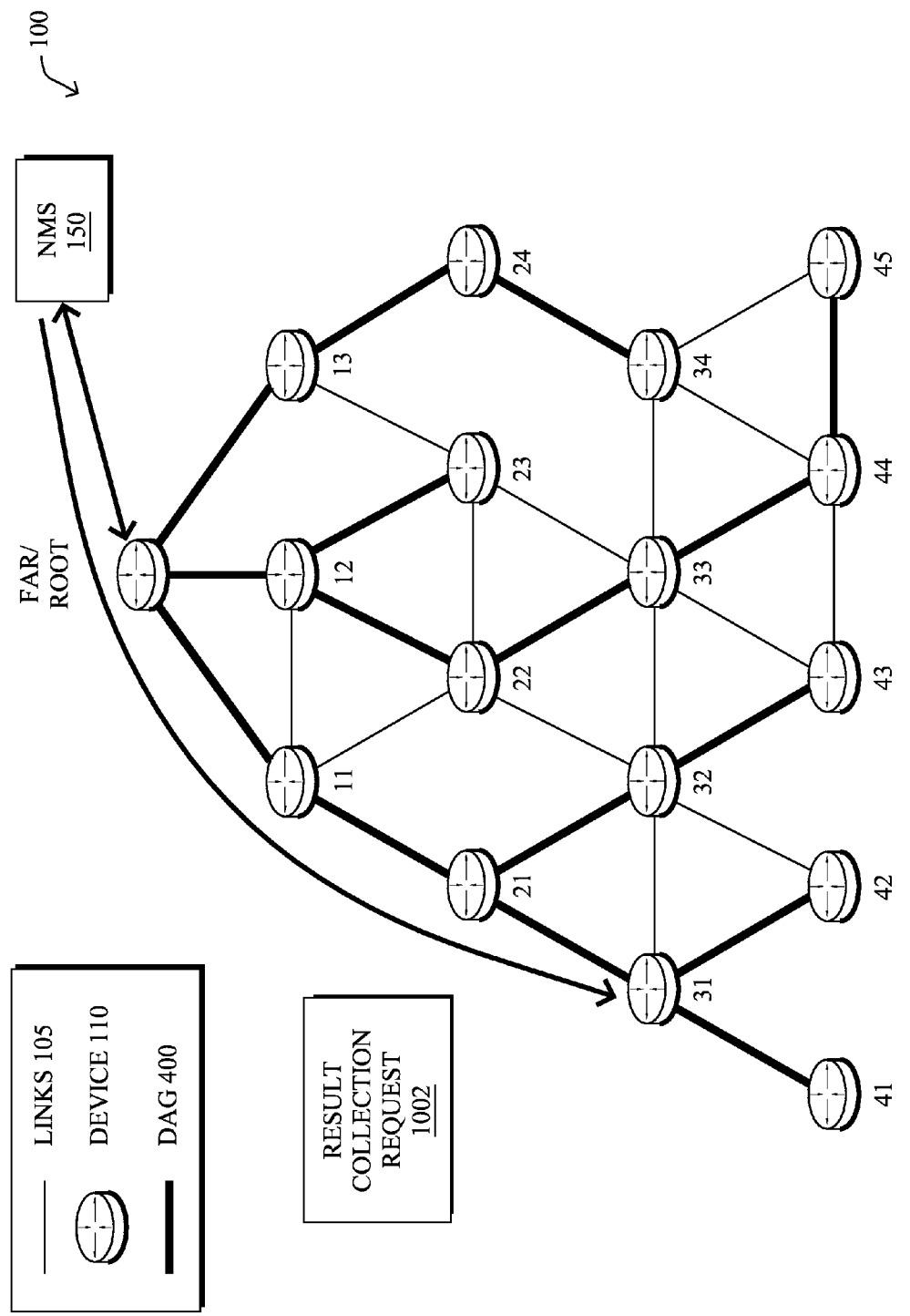
FIGS. 10A-10C illustrate an example notification mechanism for classifier validation.

After a validation test has been initiated by the CRT, the CRT may collect the results of the test, to determine whether the attack detector still satisfies its requisite performance. In particular, whatever the means for reproducing an attack scenario, the output of the classifier may be conveyed back to the CRT, in order to check the results against the ground truth and to compute a measure of the classifier's performance (e.g., a recall score, etc.). In one embodiment, the CRT may send a special results collection request to the tested attack detector. For example, as show in FIG. 10A, a result collection request 1002 may be sent to node 31 hosting an attack detector. In some cases, result collection request 1002 may notify the classifier that an attack detected during testing does not need to be reported as an actual attack to the network monitoring infrastructure. In further cases, result collection request 1002 may request that node 31 report the output of the tested classifier to the CRT that was generated during the validation test (e.g., request 1002 may indicate the testing period). In further embodiments, result collection request 1002 may be sent in conjunction with attack instructions 802, such as part of the same message.

Figure 10B:
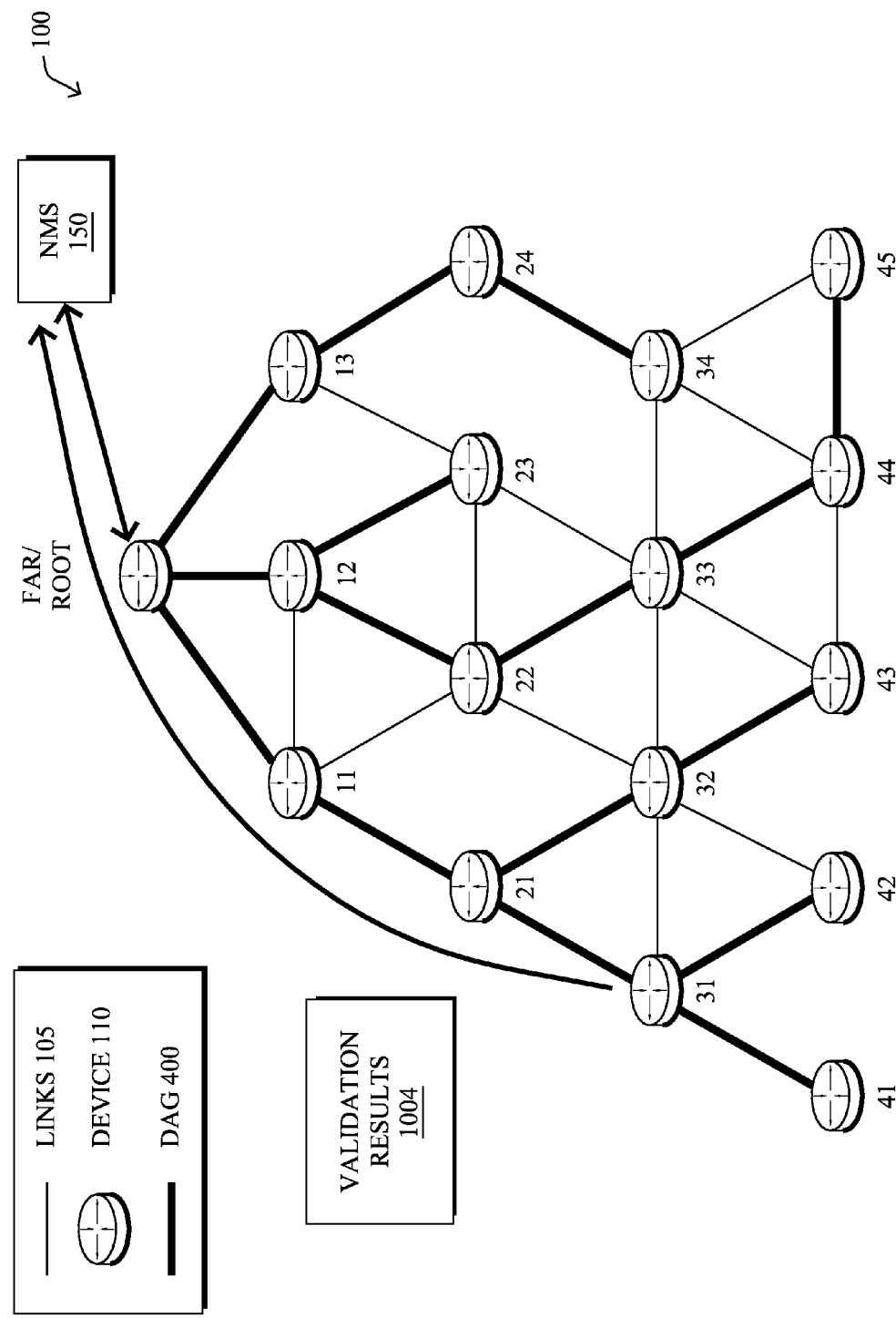
Figure 10C:
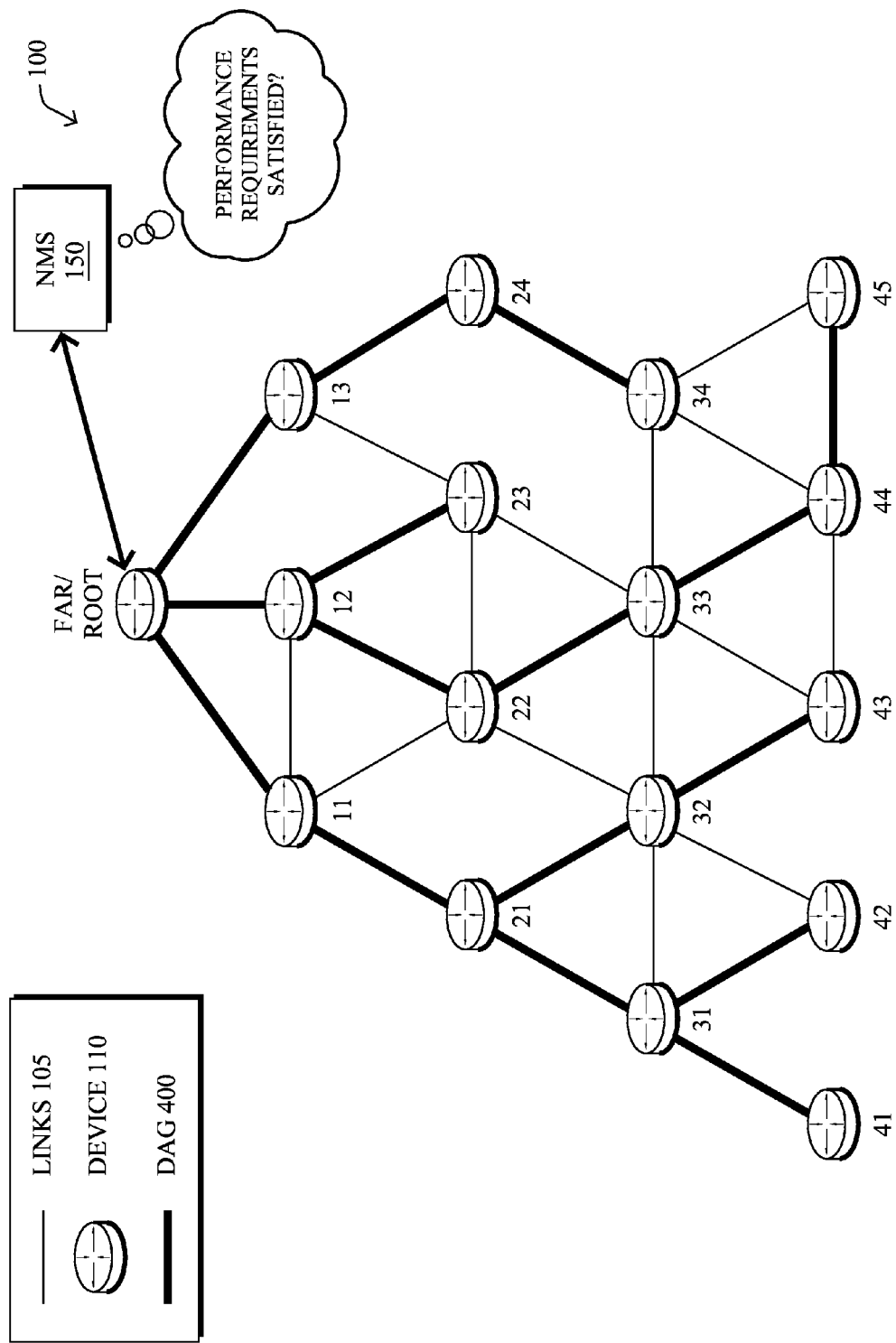

After the validation activity has been carried out, the node hosting the classifier may send a validation result message to the CRT reporting the output of the classifier during the validation time interval. For example, as shown in FIG. 10B, node 31 may send validation results 1004 that include the attack detector's output from the testing period. On reception of such a message, the CRT may compute the performance indices of the classifier and checks them against the expected performance of the attack detector (e.g., a performance set by a user, etc.). As shown in FIG. 10C, for example, the CRT may analyze validation results 1004 to compute a performance metric (e.g., a recall value) and compare the performance metric to the required performance for the attack detector. If the requirements are not satisfied, the CRT may raise an alarm, potentially including the performance results of the classifier that resulted from the validation test.

Figure 11:
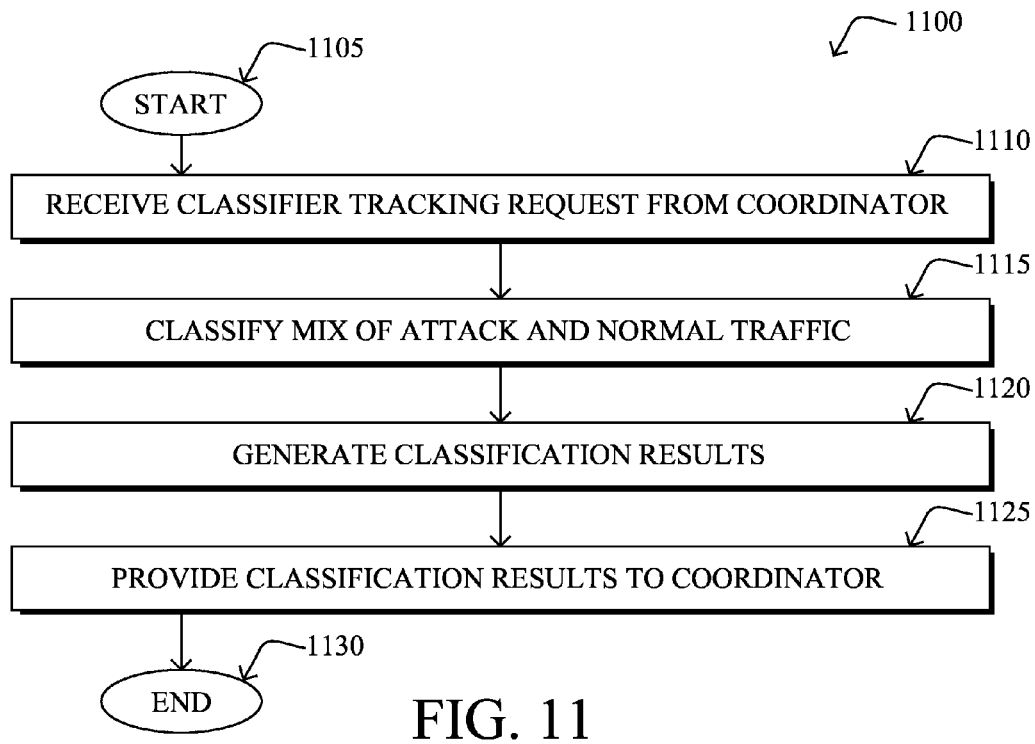
FIG. 11 illustrates an example simplified procedure for conducting an attack classifier validation test.

FIG. 11 illustrates an example simplified procedure for conducting an attack classifier validation test in accordance with one or more embodiments described herein. The procedure 1100 may start at step 1105, and continues to step 1110, where, as described in greater detail above, a network device receives a classifier tracking request from a coordinator device. For example, a node hosting an attack classifier may be asked by a coordinator to track its outputs during a testing period indicated by the request.

At step 1115, the network device may classify data corresponding to a mixture of attack traffic and normal/legitimate traffic observed by the device, as described in greater detail above. Notably, the attack traffic may correspond to a full attack trace or may be records that are derived from such a trace (e.g., Netflow records, etc.). In one embodiment, the mixture may include attack traffic records that are mixed locally with those of actual traffic currently observed by the network device. For example, attack records to be classified during the test may be received from the coordinator device or retrieved from a local memory. In some cases, the attack traffic records may be tailored to the network device or to a particular attack scenario to be tested. In another embodiment, the classified mixture may include attack traffic sent by another node to the network device during the test in conjunction with actual network traffic. In some cases, classification of the mixed traffic may also be performed as a separate process from that of the classification of the current network traffic observed by the network device, so as to allow the current network traffic to be monitored during the test.

At step 1120, the network device generates classification results, as detailed above. Generally speaking, the attack detector may store its output during the testing period. For example, the classification results may indicate when the device detected an attack, computed statistics regarding any attacks detected during the test, or even a performance for the classifier itself (e.g., a recall value computed locally by the network device, etc.).

At step 1125, the device provides the classification results to the coordinator device, as described in greater detail above. In some cases, the coordinator device may notify the network device before a testing period as to when the test will be performed. For example, if the test involves other nodes sending attack traffic to the network device, the network device may be notified beforehand. In response to such a notification, the network device may delay reporting any attacks detected during the testing period and report the results to the coordinator device once testing has completed. Based on the classification results, the coordinator device may determine whether or not the performance of the attack detector is above a specified performance threshold. For example, the coordinator device may compare a computed recall for the attack detector classifier to a performance threshold, to determine whether the attack detector is still adequately able to detect an attack. Procedure 1100 then ends at step 1130.

Figure 12:
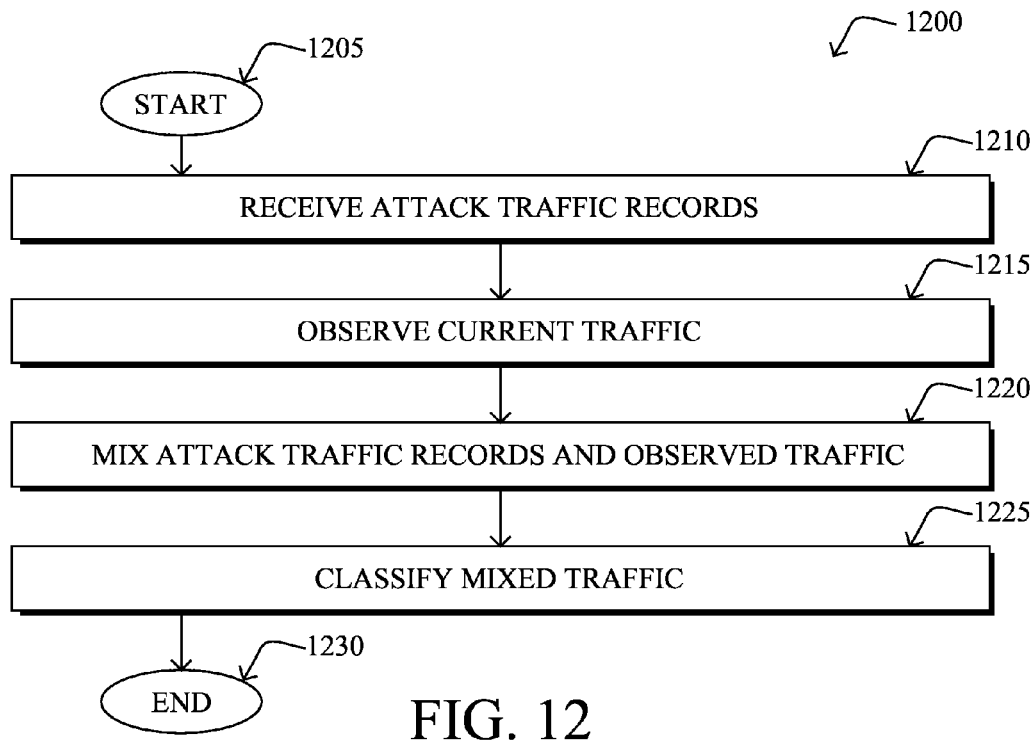
FIG. 12 illustrates an example simplified procedure for testing classifier effectiveness by mixing attack traffic data with actual traffic data.

FIG. 12 illustrates an example simplified procedure for testing classifier effectiveness by mixing attack traffic data with actual traffic data in accordance with one or more embodiments described herein. The procedure 1200 may start at step 1205, and continues to step 1210, where, as described in greater detail above, an attack detection classifier receives attack traffic records. In one embodiment, the device hosting the classifier receives the attack traffic records from a coordinator device that schedules the testing of the classifier's performance. In another embodiment, the network device hosting the attack detector may already have the corresponding attack records stored in its local memory. In such a case, the attack detector may retrieve the attack records from the local memory. In some embodiments, the attack traffic records may be modified either by the coordinator device or the local network device, to tailor the attack to the tested detector, to adjust the parameters of the attack, etc.

At step 1215, the network device hosting the attack detector observes current traffic, as described in greater detail above. In other words, during a test of the performance of the attack detector, the node hosting the detector may still continue to process current network traffic without interruption. In some cases, the attack detector may also classify the current network traffic as a separate process from the testing procedure, to ensure that a current attack is not present.

At step 1220, the network device mixes the attack traffic records and the observed traffic, as detailed above. In particular, during a scheduled validation test of the attack detector, the attack detector may classify traffic data that includes both the attack traffic records and the currently observed traffic by the device. In such a way, an attack may be simulated at the local device without generating additional network traffic (e.g., the tested attack type is simulated locally by the attack detector).

At step 1225, the network device classifies the mixed traffic, as described in greater detail above. In other words, the attack classifier may attempt to classify the traffic included in the attack traffic records during the validation period. Procedure 1200 then ends at step 1230.

Figure 13:
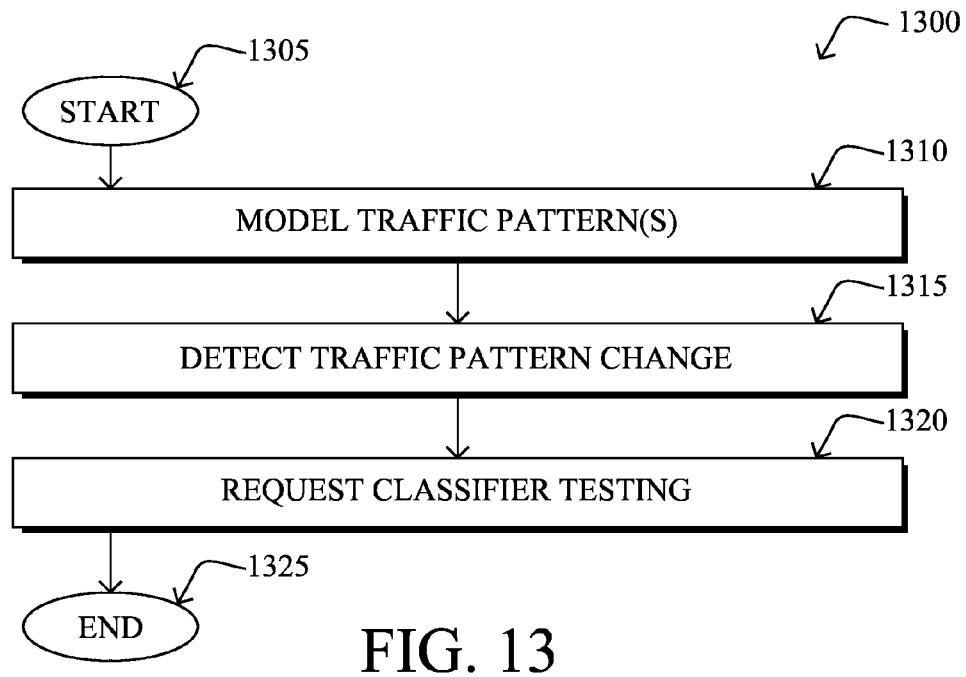
FIG. 13 illustrates an example simplified procedure for requesting classifier testing.

FIG. 13 illustrates an example simplified procedure for requesting classifier testing in accordance with one or more embodiments described herein. The procedure 1300 may start at step 1305, and continues to step 1310, where, as described in greater detail above, a network device hosting an attack detector may model traffic pattern(s). Any number of machine learning techniques may be used to model the traffic. For example, Gaussian Mixture Models, cluster analysis, change point detection, or the like, may be used to model the traffic patterns observed by the network device. At step 1315, the network device may detect a traffic pattern change, as described in greater detail above. In various cases, the network device may observe the traffic flowing through the node and compare the observed traffic to its machine learning traffic model. If the observed traffic deviates from the traffic model by a threshold amount, the device may treat this condition as a detected change in its traffic pattern. For example, if a new application is installed, this may change the aggregated statistics of the observed traffic.

At step 1320, the network device may request classifier testing from a coordinator device, as detailed above. For example, as described above, the network device hosting the attack detector may request that a CRT schedule a test of the detector's performance, in response to the device detecting a traffic pattern change. Notably, changing network conditions may be such that the current network conditions have drifted enough from those used to train the detector, thereby impacting the performance of the detector. In such a case, the network device hosting the attack detector may request that its performance be evaluated, to ensure that the attack detector is still valid and meets its required performance. Procedure 1300 then ends at step 1325.

Figure 14:
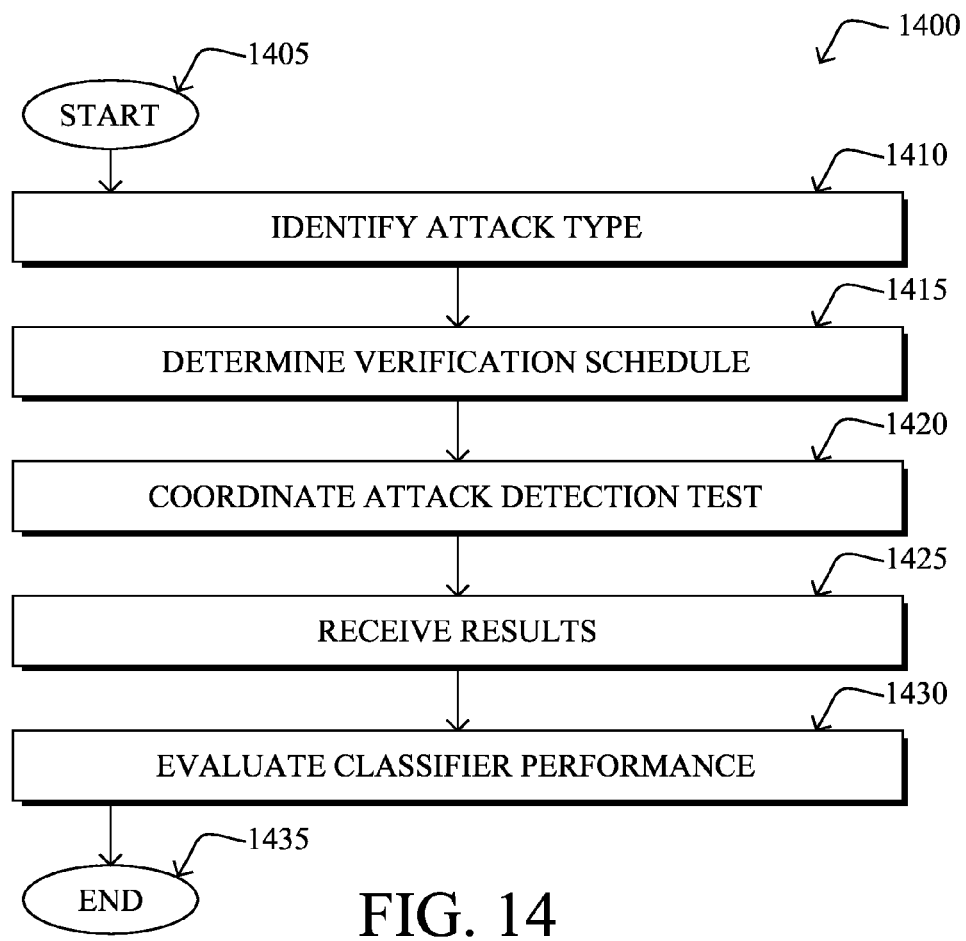
FIG. 14 illustrates an example simplified procedure for evaluating the performance of an attack detection classifier.

FIG. 14 illustrates an example simplified procedure for evaluating the performance of an attack detection classifier in accordance with one or more embodiments described herein. The procedure 1400 may start at step 1405, and continues to step 1410, where, as described in greater detail above, a coordinator device identifies an attack type to be tested. For example, the coordinator device may determine that the ability of a deployed attack detector in the network is to be tested for a particular attack type (e.g., a DoS attack, a distributed DoS attack, etc.).

At step 1415, the coordinator device determines a verification schedule, as described in greater detail above. Said differently, the coordinator device may determine when the verification test of the deployed attack detector is to occur. In some embodiments, the coordinator device may request authorization of the verification schedule from a network policy engine, prior to initiating the test. In these cases, the policy engine may operate to ensure that the requested test will not impact actual network traffic during the scheduled test.

At step 1420, the coordinator device coordinates the attack detection test, as detailed above. In some embodiments, the coordinator device instruct the device hosting the attack detector to mix attack traffic records with currently observed traffic during a specified testing period. In other embodiments, the coordinator device may instruct a set of one or more network nodes to send attack traffic to the detector device during the attack detection test. In such cases, the coordinator may instruct the one or more other devices to flag the attack traffic, thereby allowing the tested detector to distinguish between an actual attack and a tested attack. In another embodiment, the coordinator may instruct the one or more other nodes to deprioritize the attack traffic with respect to actual network traffic, so as not to impact the performance of the network during the test. In a further embodiment, the coordinator device may instruct the one or more other nodes to use a different routing topology during the test than their normal routing topologies (e.g., a node may be instructed to initiate an attack against a neighboring device to which it does not normally communicate directly).

At step 1425, the coordinator device receives testing results from the device hosting the attack detector, as described in greater detail above. Such results may indicate whether or not the tested device detected an attack during the test, the number of times an attack was detected during testing, when the attack(s) were detected, statistics regarding any detected attacks, or any other information regarding the output of the attack detector during the testing period.

At step 1430, the coordinator device evaluates the performance of the attack detection classifier, as detailed above. In some cases, the coordinator device may generate a performance metric for the classifier based on the received testing results (e.g., a recall value for the classifier). In other cases, the device hosting the classifier may itself compute the performance metric and include the metric in the results received in step 1425. The coordinator device may compare the performance metric to a performance threshold, to determine whether the performance of the attack detection classifier satisfies its requisite performance. If not, the coordinator device may initiate corrective measures, such as alerting a human operator, retraining the classifier, installing a different classifier on the device, instructing other network devices to detect attacks, etc. Procedure 1400 then ends at step 1435.

It should be noted that while certain steps within procedures 1100-1400 may be optional as described above, the steps shown in FIGS. 11-14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1400 are described separately, certain steps from each procedure may be incorporated into each other procedure, and the procedures are not meant to be mutually exclusive.

The techniques described herein, therefore, provide for mechanisms whereby the performance of a deployed attack detector in a network may be evaluated. With respect to most keep-alive mechanisms, these techniques allow not only validating that the attack detector is alive and responsive, but also that it can detect attacks in the current network traffic scenario. With respect to blind attack replay approaches, the techniques herein also allow reproduction of an attack without impairing legitimate traffic and in an automated way.

While there have been shown and described illustrative embodiments that provide for validating the detection of a network attack, it is to be understood that various other adaptations and modifications may be made within the spirit and scope of the embodiments herein. For example, while the techniques herein are described primarily with respect to attack-detection classifiers, the techniques herein may also be used to vote on different classification labels. In addition, while the techniques herein are described primarily in the context of an LLN, the techniques herein may be applied more generally to any form of computer network, such as an enterprise network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
identifying, by a coordinator device in a network, a type of network attack;
determining, by the coordinator device, a verification schedule during which an attack classifier executed by a device in the network is to be tested;
coordinating, by the coordinator device, a validation test for the attack classifier for execution during the verification schedule and for the identified type of network attack, wherein the validation test includes instructing the device in the network to:
classify a set of network traffic that includes traffic observed by the device and attack traffic specified by the coordinator device;
generate classification results based on the classified set of network traffic; and
provide the classification results to the coordinator device,
wherein the attack traffic and the observed traffic are received from one or more other devices in the network, and wherein the coordinator device instructs the one or more other devices to send the attack traffic at a low priority;
receiving, at the coordinator device, results of the validation test from the device; and
evaluating, by the coordinator device, a performance of the attack classifier based on the results of the validation test, wherein evaluating includes determining when the performance of the attack classifier is above a specified performance threshold to determine whether the attack classifier is still adequately able to detect an attack.

2. The method as in claim 1, wherein coordinating the validation test comprises:
instructing the device to evaluate a particular set of attack traffic during the validation test by mixing the attack traffic with traffic observed by the device.

3. The method as in claim 1, wherein coordinating the validation test comprises:
instructing a set of one or more network nodes to send attack traffic to the device during the validation test.

4. The method as in claim 3, wherein the instruction causes the set of one or more network nodes to flag the attack traffic as testing traffic.

5. The method as in claim 3, wherein the set of one or more network nodes deprioritize the attack traffic with respect to other network traffic.

6. The method as in claim 1, wherein the set of one or more network nodes are instructed to use a different routing topology than a normal routing topology during the validation test.

7. The method as in claim 1, wherein the verification schedule is authorized by a network policy engine.

8. An apparatus, comprising:
one or more network interfaces to communicate with a network;
a processor coupled to the network interfaces and configured to execute one or more processes; and
a memory configured to store a process executable by the processor, the process when executed operable to:
identify a type of network attack;
determine a verification schedule during which an attack classifier executed by a device in the network is to be tested;
coordinate a validation test for the attack classifier for execution during the verification schedule and for the identified type of network attack, wherein the validation test includes instructing the device in the network to:
classify a set of network traffic that includes traffic observed by the device and attack traffic specified by the coordinator device;
generate classification results based on the classified set of network traffic; and
provide the classification results to the coordinator device,
wherein the attack traffic and the observed traffic are received from one or more other devices in the network, and wherein the coordinator device instructs the one or more other devices to send the attack traffic at a low priority;
receive results of the validation test from the device; and
evaluate a performance of the attack classifier based on the results of the validation test, wherein evaluating includes determining when the performance of the attack classifier is above a specified performance threshold to determine whether the attack classifier is still adequately able to detect an attack.

9. The apparatus as in claim 8, wherein the validation test is coordinated by:
instructing the device to evaluate a particular set of attack traffic during the validation test by mixing the attack traffic with traffic observed by the device.

10. The apparatus as in claim 8, wherein the validation test is coordinate by:
instructing a set of one or more network nodes to send attack traffic to the device during the validation test.

11. The apparatus as in claim 10, wherein the instruction causes the set of one or more network nodes to flag the attack traffic as testing traffic.

12. The apparatus as in claim 10, wherein the set of one or more network nodes deprioritize the attack traffic with respect to other network traffic.

13. The apparatus as in claim 8, wherein the set of one or more network nodes are instructed to use a different routing topology than a normal routing topology during the validation test.

14. The apparatus as in claim 8, wherein the verification schedule is authorized by a network policy engine.

15. A tangible non-transitory computer readable medium storing program instructions that cause a computer to execute a process, the process comprising:
identifying, as a coordinator device in a network, a type of network attack;

determining, as the coordinator device, a verification schedule during which an attack classifier executed by a device in the network is to be tested;

coordinating, as the coordinator device, detection validation test for the attack classifier for execution during the verification schedule and for the identified type of network attack, wherein the validation test includes instructing the device in the network to:

classify a set of network traffic that includes traffic observed by the device and attack traffic specified by the coordinator device;

generate classification results based on the classified set of network traffic; and provide the classification results to the coordinator device, wherein the attack traffic and the observed traffic are received from one or more other devices in the network, and wherein the coordinator device instructs the one or more other devices to send the attack traffic at a low priority;

receiving, as the coordinator device, results of the validation test from the device; and evaluating, as the coordinator device, a performance of the attack classifier based on the results of the validation test, wherein evaluating includes determining when the performance of the attack classifier is above a specified performance threshold to determine whether the attack classifier is still adequately able to detect an attack.

16. The tangible non-transitory computer readable medium as in claim 15, wherein coordinating the validation test comprises:

instructing the device to evaluate a particular set of attack traffic during the validation test by mixing the attack traffic with traffic observed by the device.

17. The tangible non-transitory computer readable medium as in claim 15, wherein coordinating the validation test comprises:

instructing a set of one or more network nodes to send attack traffic to the device during the validation test.

18. The tangible non-transitory computer readable medium as in claim 17, wherein the instruction causes the set of one or more network nodes to flag the attack traffic as testing traffic.

19. The tangible non-transitory computer readable medium as in claim 17, wherein the set of one or more network nodes deprioritize the attack traffic with respect to other network traffic.

20. The tangible non-transitory computer readable medium as in claim 15, wherein the set of one or more network nodes are instructed to use a different routing topology than a normal routing topology during the validation test.

* * * * *

UNITED STATES PATENT AND TRADEMARK OFFICE
CERTIFICATE OF CORRECTION

| | | |
|---|---|---|
| PATENT NO. | : 9,922,196 B2 | Page 1 of 1 |
| APPLICATION NO. | : 15/386873 | |
| DATED | : March 20, 2018 | |
| INVENTOR(S) | : Andrea Di Pietro et al. | |

It is certified that error appears in the above-identified patent and that said Letters Patent is hereby corrected as shown below:

In the Specification

In Column 2, Line 56, please amend as shown:
tal hierarchy (SDH) links, or Powerline Communications In Column 4, Line 24, please amend as shown:
248, which may be configured depending upon the Signed and Sealed this
Seventeenth Day of November, 2020

Andrei Iancu
*Director of the United States Patent and Trademark Office*